(12) United States Patent
Kawata et al.

(10) Patent No.: US 9,104,215 B2
(45) Date of Patent: Aug. 11, 2015

(54) DRIVING DEVICE

(71) Applicant: Rohm Co., Ltd., Kyoto (JP)

(72) Inventors: Shinji Kawata, Kyoto (JP); Yoichi Kajiwara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/322,451

(22) Filed: Jul. 2, 2014

(65) Prior Publication Data

US 2014/0333280 A1 Nov. 13, 2014

Related U.S. Application Data

(63) Continuation of application No. 14/029,085, filed on Sep. 17, 2013, now Pat. No. 8,796,956, which is a continuation of application No. 13/589,371, filed on Aug. 20, 2012, now Pat. No. 8,558,479, which is a continuation of application No. 12/672,749, filed as application No. PCT/JP2008/064285 on Aug. 8, 2008, now Pat. No. 8,269,425.

(30) Foreign Application Priority Data

Aug. 10, 2007 (JP) ................................. 2007-209909

(51) Int. Cl.
*H05B 37/02* (2006.01)
*H05B 33/02* (2006.01)
*H02M 3/00* (2006.01)
*G05F 3/08* (2006.01)
*H05B 33/08* (2006.01)

(52) U.S. Cl.
CPC .............. *G05F 3/08* (2013.01); *H05B 33/0815* (2013.01); *H05B 33/0818* (2013.01); *H05B 37/02* (2013.01); *H05B 33/0812* (2013.01); *H05B 33/0842* (2013.01); *Y02B 20/347* (2013.01)

(58) Field of Classification Search
USPC ............. 315/226, 209 R, 307, 308, 291, 224, 315/119, 123
See application file for complete search history.

(56) References Cited

U.S. PATENT DOCUMENTS 5,255,225 A 10/1993 Nambu et al.
5,398,201 A 3/1995 Nambu et al.
(Continued)

FOREIGN PATENT DOCUMENTS

EP 1 441 424 A1 7/2004
JP S62-065306 3/1987
(Continued)

OTHER PUBLICATIONS

European Patent Office, communication in patent application 08792342.1 (dated Apr. 14, 2015).

*Primary Examiner* — David H Vu
(74) *Attorney, Agent, or Firm* — Fish & Richardson P.C.

(57) ABSTRACT

A driving device comprises a first transistor (B13), a second transistor (B14), and a resistance element. The first transistor (B13) has one terminal receiving a pulsed current and a control terminal connected to the one terminal. The second transistor (B14) has one terminal connected to at least one load, the other terminal connected to a reference potential together with the other terminal of the first transistor (B13), and a control terminal connected to the control terminal of the first transistor (B13). The resistance element is connected between the control terminal of the first transistor (B13) and the other terminal of the first transistor (B13).

20 Claims, 28 Drawing Sheets

(56) References Cited

U.S. PATENT DOCUMENTS

| | | | |
|---|---|---|---|
| 5,701,133 | A | 12/1997 | Miller et al. |
| 5,796,767 | A | 8/1998 | Aizawa |
| 7,276,863 | B2 | 10/2007 | Lee et al. |
| 7,402,961 | B2 | 7/2008 | Bayat et al. |
| 7,589,475 | B2 | 9/2009 | Petzl et al. |
| 8,106,604 | B2 * | 1/2012 | Zhao et al. .................. 315/299 |
| 8,558,479 | B2 | 10/2013 | Kawata et al. |
| 2004/0085048 | A1 | 5/2004 | Tateishi |
| 2004/0195981 | A1 | 10/2004 | Mizuno et al. |
| 2005/0127883 | A1 | 6/2005 | Hoshino et al. |
| 2005/0174099 | A1 | 8/2005 | Ohkubo et al. |
| 2006/0231745 | A1 | 10/2006 | Bodano et al. |
| 2007/0001625 | A1 | 1/2007 | Kim |
| 2007/0159736 | A1 | 7/2007 | Kajita |
| 2007/0164813 | A1 | 7/2007 | Sakaguchi |
| 2008/0001551 | A1 * | 1/2008 | Abbondanzio et al. ....... 315/291 |
| 2010/0102727 | A1 | 4/2010 | Lee |
| 2010/0220049 | A1 | 9/2010 | Murakami |

FOREIGN PATENT DOCUMENTS

| | | |
|---|---|---|
| JP | 03-152193 | 3/1991 |
| JP | H03-52193 A | 3/1991 |
| JP | H08-236815 | 9/1996 |
| JP | 09-232635 | 9/1997 |
| JP | 2002-203988 | 7/2002 |
| JP | 2003-188465 | 7/2003 |
| JP | 2004-048830 | 2/2004 |
| JP | 2005-117828 | 4/2005 |
| JP | 2005-174176 | 6/2005 |
| JP | 2005-191036 | 7/2005 |
| JP | 2006-033523 | 2/2006 |
| JP | 2006-261682 | 9/2006 |
| JP | 2007-013183 | 1/2007 |
| JP | 2007-042758 | 2/2007 |
| JP | 2007-142711 | 6/2007 |
| JP | 2007-189545 | 7/2007 |
| JP | 2009-038218 | 2/2009 |

* cited by examiner

FIG.3

| PIN NO. | TERMINAL NAME | FUNCTION |
|---|---|---|
| 1 | VCC | INPUT POWER-SUPPLY TERMINAL |
| 2 | LOADSW | FET CONNECTION FOR LOAD SWITCH |
| 3 | FAIL1 | OUTPUT SIGNAL IN ABNORMAL TIME |
| 4 | VREG | INTERNAL CONSTANT-VOLTAGE OUTPUT |
| 5 | PWM | PWM LIGHT-CONTROL INPUT TERMINAL |
| 6 | SYNC | EXTERNAL SYNCHRONIZATION SIGNAL INPUT TERMINAL |
| 7 | GND | SMALL SIGNAL PORTION GND |
| 8 | VDAC | DC VARIABLE LIGHT CONTROL INPUT TERMINAL |
| 9 | ISET | RESISTOR FOR LED OUTPUT CURRENT SETTING |
| 10 | LEDEN1 | LED OUTPUT TERMINAL ENABLE TERMINAL 1 |
| 11 | LEDEN2 | LED OUTPUT TERMINAL ENABLE TERMINAL 2 |
| 12 | LED1 | LED OUTPUT TERMINAL |
| 13 | - | N. C. |
| 14 | LED2 | LED OUTPUT TERMINAL |
| 15 | LED3 | LED OUTPUT TERMINAL |
| 16 | - | N. C. |
| 17 | LED4 | LED OUTPUT TERMINAL |
| 18 | - | N. C. |
| 19 | - | N. C. |
| 20 | FAIL2 | LED OPEN, SHORT DETECTION OUTPUT SIGNAL |
| 21 | PGND | LED OUTPUT GND TERMINAL |
| 22 | CS | TERMINAL FOR DC/DC OUTPUT CURRENT DETECTION |
| 23 | SWOUT | DC/DC SWITCHING OUTPUT TERMINAL |
| 24 | EN | ENABLE TERMINAL |
| 25 | OVP | OVERVOLTAGE DETECTION TERMINAL |
| 26 | RT | RESISTOR CONNECTION FOR OSCILLATION FREQUENCY SETTING |
| 27 | SS | CAPA CONNECTION FOR SOFT START |
| 28 | COMP | Err Amp OUTPUT |

FIG.5

| ELEMENT NAME | VALUE |
|---|---|
| RLD1 | 5.1kΩ |
| RLD2 | 5.1kΩ |
| RFL1 | 5.1kΩ |
| RFL2 | 5.1kΩ |
| RPC | 820Ω |
| RT | 100kΩ |
| ROVP1 | 330kΩ |
| ROVP2 | 22kΩ |
| RCS | 0.1Ω |
| RSET | 100kΩ |
| CPC | 2.2uF |
| CSS | - |
| CVCC | 10uF |
| CREG | 10uF |
| Q1 | - |
| Q2 | - |
| L1 | 47uH |
| D1 | - |
| CVOUT | 220uF |
| RLPF | 100Ω |
| CLPF | 1000pF |
| CLD2 | 1uF |

ALL THE NUMERICAL VALUES ARE TYP. VALUES.

FIG. 7

| | SYMBOL | VALUE | UNIT | CONDITION |
|---|---|---|---|---|
| CIRCUIT CURRENT | Icc | 2.5~10 | mA | EN=2V, SYNC=VREG, RT=OPEN PWM=OPEN, ISET=OPEN, CIN=1μF |
| STANDBY CURRENT | IST | 0~2 | μA | EN=Low |
| [VREG PORTION (VREG)] | | | | |
| REFERENCE VOLTAGE | VREG | 4.5~5.5 | V | IREG=-10mA, CREG=1μF |
| [SW PORTION (SWOUT, CS)] | | | | |
| SWOUT UPPER SIDE ON RESISTANCE | RONH | 0.05~7 | Ω | ION=-10mA |
| SWOUT LOWER SIDE ON RESISTANCE | RONL | 0.05~5 | Ω | ION=10mA |
| OVERCURRENT PROTECTION OPERATION VOLTAGE | VDCS | 0.3~0.5 | V | VCS=sweep up |
| [ERROR AMPLIFIER PORTION (COMP, SS)] | | | | |
| LED CONTROL VOLTAGE | VLED | 0.7~0.9 | V | |
| COMP SINK CURRENT | ISKCP | 40~200 | μA | VLED=2V, Vcomp=1V |
| COMP SOURCE CURRENT | ISCCP | -200~-40 | μA | VLED=0V, Vcomp=1V |
| SS CHARGING CURRENT | ISS | -14~-6 | μA | VSS=1.0V |
| SS MAXIMUM VOLTAGE | VMXSS | 2.0~3.0 | V | EN=High |
| SS STANDBY CURRENT | ISTSS | 0~2 | μA | EN=Low |
| [OSCILLATOR PORTION (RT, SWOUT)] | | | | |
| OSCILLATION FREQUENCY | FOSC | 250~350 | KHz | RT=100kΩ |
| [OVP PORTION (OVP)] | | | | |
| OVERVOLTAGE DETECTION REFERENCE VOLTAGE | VDOVP | 1.86~2.14 | V | VOVP=Sweep up |
| OVP HYSTERESIS WIDTH | VDOHS | 0.35~0.55 | V | VOVP=Sweep down |
| [UVLO PORTION (VREG)] | | | | |
| REDUCED VOLTAGE DETECTION REFERENCE VOLTAGE | VDUVLO | 2.5~3.1 | V | VREG=Sweep down |
| UVLO HYSTERESIS WIDTH | VDUHS | 50~200 | mV | VREG=Sweep up |
| [LOAD SWITCH PORTION (OPEN DRAIN) (LOADSW)] | | | | |
| LOAD SWITCH Low VOLTAGE | VLDL | 0.05~0.3 | V | ILOAD=10mA |
| [LED OUTPUT PORTION (LED1-4, ISET, PWM, VDAC, OVP)] | | | | |
| LED CURRENT RELATIVE UNEVEN WIDTH | ΔILED1 | 3 | % | ILED=50mA |
| LED CURRENT ABSOLUTE UNEVEN WIDTH | ΔILED2 | 5 | % | ILED=50mA |
| ISET VOLTAGE | VISET | 1.92~2.08 | V | |
| PWM LIGHT CONTROL | Duty | 0.38~99.5 | % | FPWM=150Hz, ILED=50mA ※1, 2, 3 |
| PWM FREQUENCY | FPWM | 0~20 | KHz | Duty=50%, ILED=50mA ※2, 3 |
| VDAC GAIN | GVDAC | 20~30 | mA/V | VDAC=0~2V, ILED=50mA ※2, 3 |
| OPEN DETECTION VOLTAGE 1 | VDOP1 | 0.05~0.3 | V | VLED=Sweep down, VOVP>VDOP2, VSS≧VMXSS |
| OPEN DETECTION VOLTAGE 2 | VDOP2 | 1.56~1.84 | V | VOVP=Sweep up, VLED>VDOP1, VSS≧VMXSS |
| SHORT DETECTION VOLTAGE | VDSHT | 4.0~5.0 | V | VLED=Sweep up, VSS≧VMXSS |
| [LOGIC INPUT (EN, SYNC, PWM, LEDEN1, LEDEN2)] | | | | |
| INPUT High VOLTAGE | VINH | 3.0~5.5 | V | |
| INPUT Low VOLTAGE | VINL | GND~0.8 | V | |
| INPUT FLOW-IN CURRENT | IIN | 18~53 | μA | VIN=5V (SYNC, PWM, LEDEN1, LEDEN2) |
| INPUT FLOW-IN CURRENT | IEN | 13~38 | μA | VEN=5V (EN) |
| [FAIL OUTPUT (OPEN DRAIN) (FAIL1, FAIL2)] | | | | |
| FAIL Low VOLTAGE | VFLL | 0.05~0.2 | V | IOL=1mA |

※1 0%, 100% POSSIBLE TO INPUT
※2 ILED=VDAC÷RISET×3300
※3 ILED=VISET÷RISET×3300, VDAC>VISET

| LED EN | | LED | | | |
|---|---|---|---|---|---|
| 1 | 2 | 1 | 2 | 3 | 4 |
| L | L | ON | ON | ON | ON |
| H | L | ON | ON | ON | OFF |
| L | H | ON | ON | OFF | OFF |
| H | H | ON | OFF | OFF | OFF |

FIG.28

| PIN NUMBER | TERMINAL NAME | FUNCTION |
|---|---|---|
| 1 | COMP | ERR AMP OUTPUT |
| 2 | SS | CAPA CONNECTION FOR SOFT START |
| 3 | VCC | INPUT POWER-SUPPLY TERMINAL |
| 4 | EN | ENABLE TERMINAL |
| 5 | RT | RESISTOR CONNECTION FOR OSCILLATION FREQUENCY SETTING |
| 6 | SYNC | EXTERNAL SYNCHRONIZATION SIGNAL INPUT TERMINAL |
| 7 | GND | SMALL SIGNAL PORTION GND TERMINAL |
| 8 | PWM | PWM LIGHT-CONTROL SIGNAL INPUT TERMINAL |
| 9 | FAIL1 | OUTPUT SIGNAL IN ABNORMAL TIME |
| 10 | FAIL2 | LED OPEN, SHORT DETECTION OUTPUT SIGNAL |
| 11 | LEDEN1 | LED OUTPUT TERMINAL ENABLE TERMINAL 1 |
| 12 | LEDEN2 | LED OUTPUT TERMINAL ENABLE TERMINAL 2 |
| 13 | LED1 | LED OUTPUT TERMINAL 1 |
| 14 | LED2 | LED OUTPUT TERMINAL 2 |
| 15 | LED3 | LED OUTPUT TERMINAL 3 |
| 16 | LED4 | LED OUTPUT TERMINAL 4 |
| 17 | OVP | OVERVOLTAGE DETECTION TERMINAL |
| 18 | VDAC | DC VARIABLE LIGHT CONTROL INPUT TERMINAL |
| 19 | ISET | LED OUTPUT CURRENT SETTING TERMINAL |
| 20 | PGND | LED OUTPUT GND TERMINAL |
| 21 | — | N.C. |
| 22 | OUTL | LOW-SIDE EXTERNAL FET GATE DRIVE TERMINAL |
| 23 | DGND | LOW-SIDE FET DRIVER SOURCE TERMINAL |
| 24 | SW | HIGH-SIDE FET SOURCE TERMINAL |
| 25 | OUTH | HIGH-SIDE EXTERNAL FET GATE DRIVE TERMINAL |
| 26 | BOOT | HIGH-SIDE FET DRIVER POWER-SUPPLY TERMINAL |
| 27 | CS | DC/DC OUTPUT CURRENT DETECTION TERMINAL |
| 28 | VREG | INTERNAL CONSTANT-VOLTAGE OUTPUT |

FIG.29

| | SYMBOL | VALUE | UNIT | CONDITION |
|---|---|---|---|---|
| CIRCUIT CURRENT | ICC | 7 | mA | EN=Hi, SYNC=Hi, RT=Low PWM=Low, ISET=OPEN, CIN=1μF |
| STANDBY CURRENT | IST | 4~8 | μA | EN=Low |
| [VREG PORTION] | | | | |
| REFERENCE VOLTAGE | VREG | 4.5~5.5 | V | IREG=-5mA, CREG=1μF |
| [OUTH PORTION] | | | | |
| OUTH UPPER SIDE ON RESISTANCE | RONHH | 3 | Ω | ION=-10mA |
| OUTH LOWER SIDE ON RESISTANCE | RONHL | 2 | Ω | ION=10mA |
| OVERCURRENT PROTECTION OPERATION VOLTAGE | VOLIMIT | VCC-0.6 | V | |
| [OUTL PORTION] | | | | |
| OUTL UPPER SIDE ON RESISTANCE | RONLH | 3 | Ω | ION=-10mA |
| OUTL LOWER SIDE ON RESISTANCE | RONLL | 2 | Ω | ION=10mA |
| [SW PORTION] | | | | |
| SW LOWER SIDE ON RESISTANCE | Ron_sw | 2.0 | Ω | ION_sw=10mA |
| [ERROR AMPLIFIER PORTION] | | | | |
| LED CONTROL VOLTAGE | VLED | 1.0 | V | |
| COMP SINK CURRENT | ICOMPSINK | 25 | μA | VLED=2V, Vcomp=1V |
| COMP SOURCE CURRENT | ICOMPSOURCE | -25 | μA | VLED=0V, Vcomp=1V |
| [OSCILLATOR PORTION] | | | | |
| OSCILLATION FREQUENCY | fOSC | 300 | KHz | RT=100kΩ |
| [OVP PORTION] | | | | |
| OVERVOLTAGE DETECTION REFERENCE VOLTAGE | VOVP | 2.0 | V | VOVP=Sweep up |
| OVP HYSTERESIS WIDTH | VOHYS | 0.55 | V | VOVP=Sweep down |
| LED ANODE SHORT DETECTION REFERENCE VOLTAGE | VSCP | 0.8 | V | |
| SCP HYSTERESIS WIDTH | VSHYS | 0.2 | V | |
| SCP LATCH OFF DELAY TIME | TSCP | 100 | ms | RT=100kΩ |
| [UVLO PORTION] | | | | |
| REDUCED VOLTAGE DETECTION REFERENCE VOLTAGE | VUVLO | 2.8 | V | VREG : Sweep down |
| UVLO HYSTERESIS WIDTH | VUHYS | 100 | mV | VREG : Sweep up |
| [LED OUTPUT PORTION] | | | | |
| LED CURRENT RELATIVE UNEVEN WIDTH | ΔILED1 | -3~+3 | % | ILED=50mA, ΔILED1=(ILED1/ILED_AVG-1)/100 |
| LED CURRENT ABSOLUTE UNEVEN WIDTH | ΔILED2 | -5~+5 | % | ILED=50mA, ΔILED2=(ILED2/50mA-1)/100 |
| ISET VOLTAGE | VISET | 2.0 | V | ILED=VISET÷RISET×Gain, VDAC>2V |
| PWM MIN LIGHT CONTROL | Dmin | 0.38 | % | fPWM=150Hz, ILED=50mA |
| PWM MAX LIGHT CONTROL | Dmax | 99.0 | % | fPWM=150Hz, ILED=50mA |
| PWM FREQUENCY | fPWM | 20 | KHz | Duty=50%, ILED=50mA |
| VDAC GAIN | GVDAC | 25 | mA/V | VDAC=0~2V, ILED=VDAC÷RISET×Gain, RISET=130kΩ |
| LED OPEN DETECTION VOLTAGE | VOPEN | 0.3 | V | VLED= Sweep down |
| LED SHORT DETECTION VOLTAGE | VSHORT | 4.5 | V | VLED= Sweep up |
| LED SHORT DETECTION LATCH OFF DELAY TIME | TSHORT | 100 | ms | RT=100kΩ |
| PWM LATCH OFF DELAY TIME | TPWM | 100 | ms | RT=100kΩ |
| [LOGIC INPUT (EN, SYNC, PWM, LEDEN1, LEDEN2)] | | | | |
| INPUT High VOLTAGE | VINH | 3.0~5.5 | V | |
| INPUT Low VOLTAGE | VINL | GND~0.8 | V | |
| INPUT FLOW-IN CURRENT | IIN | 35 | μA | VIN=5V (SYNC, PWM, LEDEN1, LEDEN2) |
| INPUT FLOW-IN CURRENT | IEN | 25 | μA | VEN=5V (EN) |
| [FAIL OUTPUT (OPEN DRAIN)] | | | | |
| FAIL Low VOLTAGE | VOL | 0.1 | V | IOL=1mA |

<MIRROR RATIO 1:1650>

☐ : TRANSISTOR B13
▨ : TRANSISTOR B14

<MIRROR RATIO 1:100>

☐ : TRANSISTOR B13
▨ : TRANSISTOR B14

DRIVING DEVICE

TECHNICAL FIELD

The present invention relates to a driving device that performs driving control of a load (light emitting diode and the like).

BACKGROUND ART

As a backlight for a LCD (Liquid Crystal Display) panel (e.g., car navigation monitor), currently, a cold cathode fluorescent lamp (CCFL) is chiefly used; however, from viewpoints of an Hg-free movement and advantages in high brightness, energy saving, longevity and the like, in recent years, a white TED (Light Emitting Diode) is in practical use; and various technologies are disclosed and proposed for a LED driving device (so-called LED driver) that performs drive control (e.g., see a patent document 1).
Patent document: JP-A-2007-13183

DISCLOSURE OF THE INVENTION

Problems to be Solved by the Invention

When making a LED emit light under PWM control, a controllable duty-ratio range is limited by characteristics of the element.

Besides, because of the characteristics of the element, accuracy of an electric current to make the LED emit light is low.

In light of the above problems, it is an object of the present invention to provide a driving device that is able to extend the controllable duty-ratio range and raise the accuracy of a control current regardless of a change in the element.

Means for Solving the Problem

To achieve the above object, a driving device according to the present invention is so structured (first structure) as to include: a first transistor into one terminal of which a pulse-shape current is input and the one terminal of which is connected with a control terminal; a second transistor with one terminal of which at least one load is connected and the other terminal of which is connected with a reference potential together with the other terminal of the first transistor, and a control terminal of which is connected with a control terminal of the first transistor; wherein a resistor element is connected between the control terminal of the first transistor and the other terminal of the first transistor.

Besides, the driving device having the above first structure may be so structured (second structure) as to further include: a second reference voltage supply portion and a second reference voltage supply portion that separately supply a predetermined voltage to one terminal of the first transistor and one terminal of the second transistor.

Advantages of the Invention

In the driving device according to the present invention, by inserting a resistor, it is possible to speed up rising of the transistor, so that it becomes possible to extend a range of controllable duty ratios.

Besides, in the driving device according to the present invention, by maintaining one terminal of the transistor at a constant voltage, it becomes possible to raise the accuracy of a control current regardless of a change in the element.

BRIEF DESCRIPTION OF DRAWINGS

FIG. 3 is a table representing pin numbers, terminal names and functions of external terminals.

FIG. 5 is a setting table showing examples of constants of external elements.

FIG. 7 is a table showing electric characteristics of the semiconductor device 10.

FIG. 28 is a table representing pin numbers, terminal names and functions of external terminals.

FIG. 29 is a table representing electric characteristics of the semiconductor device 20.

Figure 1:
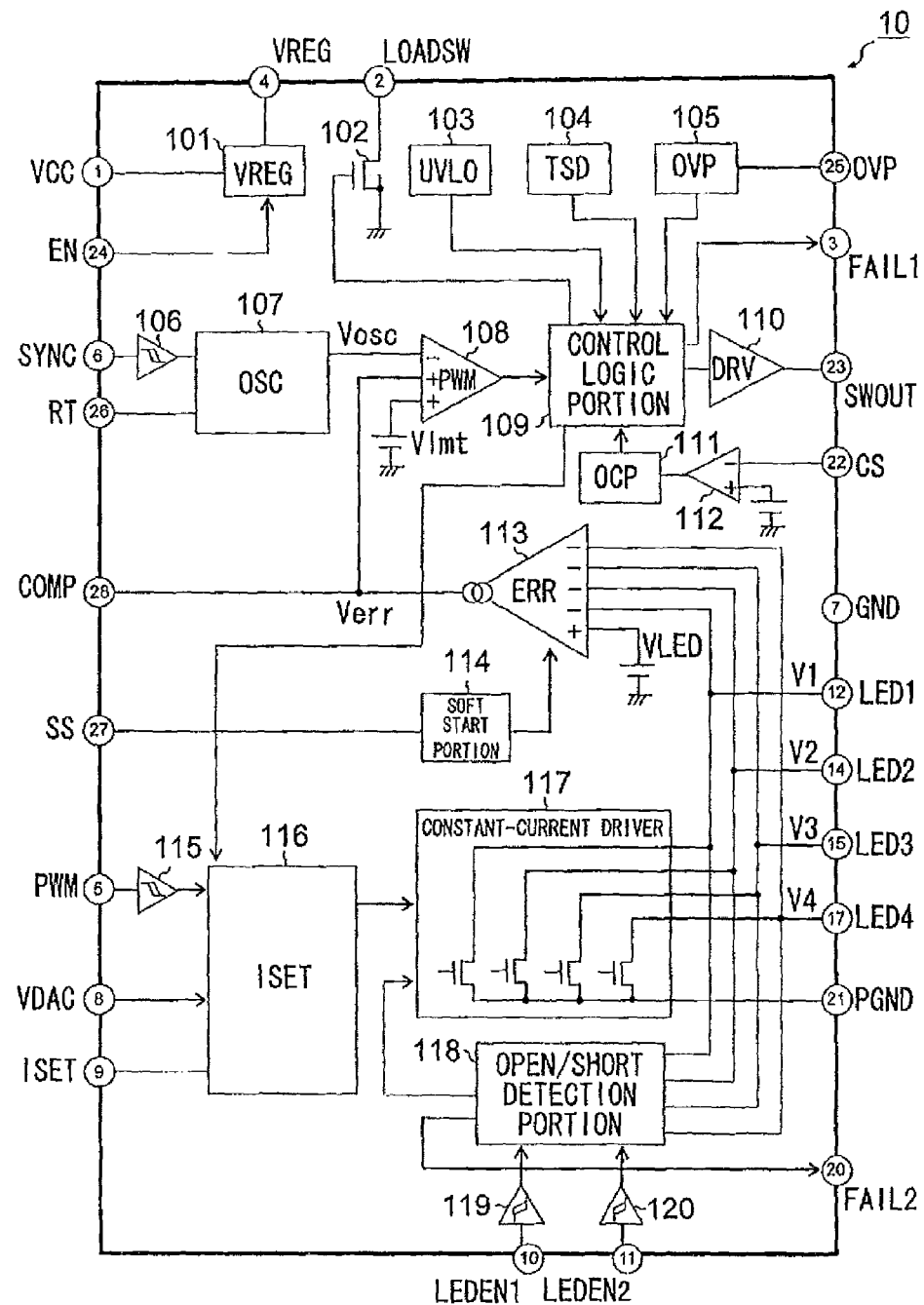
FIG. 1 is a block diagram showing a first embodiment of a semiconductor device according to the present invention.

LIST OF REFERENCE SYMBOLS 10 semiconductor device
101 reference voltage generation portion (VREG portion)
102 switch
103 reduced-voltage protection portion (UVLO portion)
104 temperature protection portion (TSD portion)
105 overvoltage protection portion (OVP portion)
106 input buffer
107 oscillator portion
108 PWM comparator
109 control logic portion
110 driver
111 overcurrent protection portion (OCP portion)
112 comparator
113 error amplifier
114 soft start portion
115 input buffer
116 current set portion
117 constant-current driver
118 open/short detection portion
119 input buffer
120 input buffer
20 semiconductor device
201 reference voltage generation portion (VREG portion)
202 reduced-voltage protection portion (UVLO portion)
203 temperature protection portion (TSD portion)
204 short protection portion (SCP portion)
205 overvoltage protection portion (OVP portion)
206 overcurrent protection portion (OCP portion)
207 comparator
208 control logic portion
209 input buffer
210 oscillator portion
211 slope-voltage generation portion
212 PWM comparator
213 driver control portion
214 driver
215 N-channel type field effect transistor
216 driver
217 error amplifier
218 soft start portion
219 input buffer
220 current set portion
221 constant-current driver
222 open/short detection portion
223 input buffer
224 input buffer

BEST MODE FOR CARRYING OUT THE INVENTION

FIG. 1 is a block diagram showing a first embodiment of a semiconductor device according to the present invention.

First, an overview of a semiconductor device 10 according to the present embodiment is described.

The semiconductor device 10 is a 36 V-resistant white-LED driver IC; and a voltage step-up DC/DC converter and a four-channel output constant-current driver are integrated into one chip. The semiconductor device 10 is able to perform light control of the white LED by using any of PWM [Pulse Width Modulation] control and VDAC control.

Next, features of the semiconductor device 10 according to the present embodiment are described.

A first feature is that the input voltage range of a power-supply voltage VCC is 4.5 to 30[V]. A second feature is that a voltage step-up DC/DC converter is incorporated. A third feature is that a four-channel constant-current driver for supplying an output current ILED to a LED (the maximum electric-current value: 150 [mA]). A fourth feature is that the semiconductor device 10 interacts with PWM light control (the duty ratio: 0.38 to 99.5[%]). A fifth feature is that various protection functions (UVLO [Under Voltage Lock Out], OVP [Over Voltage Protection], TSD [Thermal Shut Down], OCP [Over Current Protection]) are incorporated. A sixth feature is that a detection function for detecting a LED abnormal state (open/short) is incorporated. A seventh feature is that an HSOP-M28 package (see FIG. 2) is employed.

The semiconductor device 10 according to the present embodiment is used for drive control of a backlight of a car navigation monitor, backlights of medium- and small-sized LCD panels and the like.

The semiconductor device 10 having the above features according to the present embodiment, as shown in FIG. 1, is composed of an integration of: a reference voltage generation portion 101 (hereinafter, called a VREG portion 101); a switch 102; a reduced-voltage protection portion 103 (hereinafter, called a UVLO portion 103); a temperature protection portion 104 (hereinafter, called a TSD portion 104); an overvoltage protection portion 105 (hereinafter, called an OVP portion 105); an input buffer 106; an oscillator portion 107; a PWM comparator 108; a control logic portion 109; a driver 110; an overcurrent protection portion 111 (hereinafter, called an OCP portion 111); a comparator 112; an error amplifier 113; a soft start portion 114; an input buffer 115; a current set portion 116; and a constant-current driver 117; an open/short detection portion 118; and input buffers 119 and 120.

Here, it is possible to roughly divide the above circuit portion of the semiconductor device 10 into four blocks of: a VREG block (the VREG portion 101); a voltage step-up DC/DC controller block (the switch 102, input buffer 106, oscillator portion 107, PWM comparator 108, control logic portion 109, driver 110, OCP portion 111, comparator 112, error amplifier 113 and soft start portion 114); a current driver block (the input buffer 115, current set portion 116, constant-current driver 117, open/short detection portion 118 and input buffers 119 and 120); a protection block (the UVLO portion 103, TSD portion 104, OVP portion 105).

Besides, the semiconductor device 10 according to the present embodiment includes 28 external terminals (1st to 28th pins) as means for securing electric connections with outside.

Figure 2:
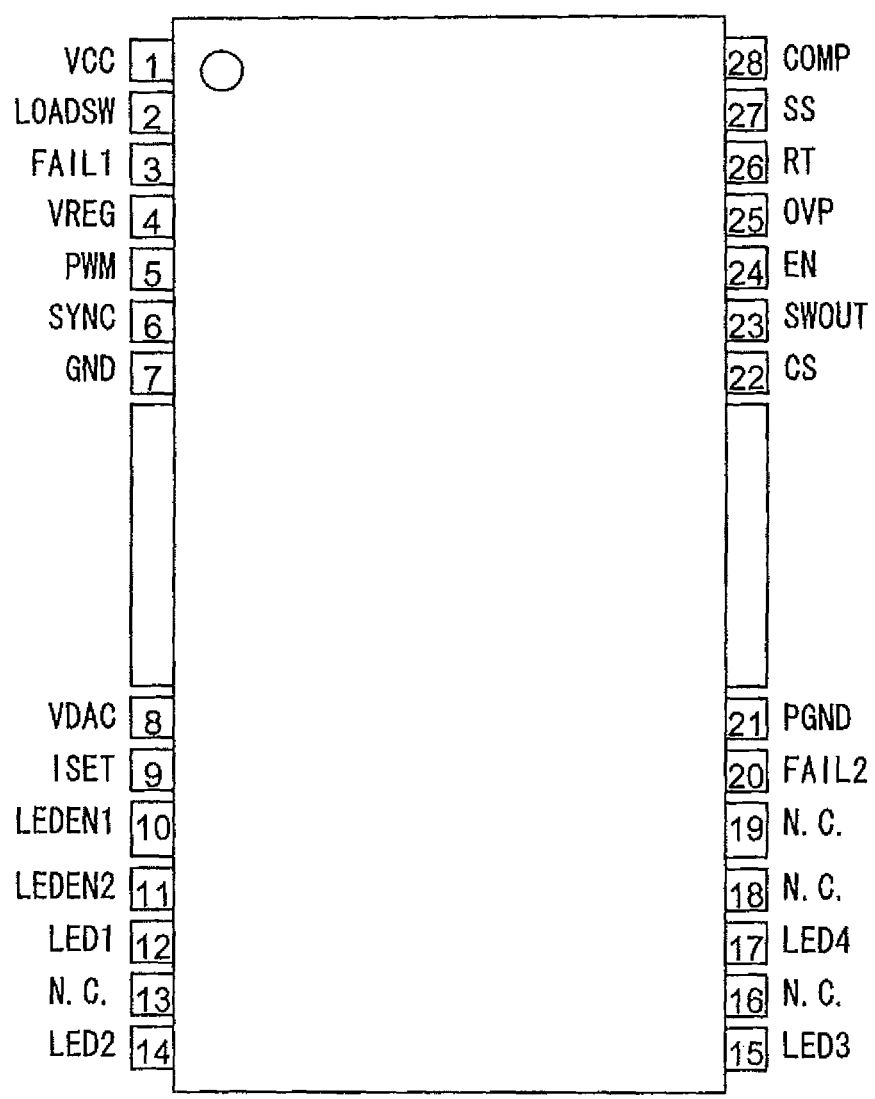
FIG. 2 is a pin arrangement diagram of a semiconductor device 10.

FIG. 2 is a pin arrangement diagram of the semiconductor device 10 and FIG. 3 is a table which shows pin numbers, terminal names and functions of the external terminals. In FIG. 2, wide terminals disposed at both sides of central portions of the semiconductor device 10 are FIN terminals that are linked to subground and improve heat radiation.

Next, detailed description of external connections of the semiconductor device 10 is performed.

Figure 4:
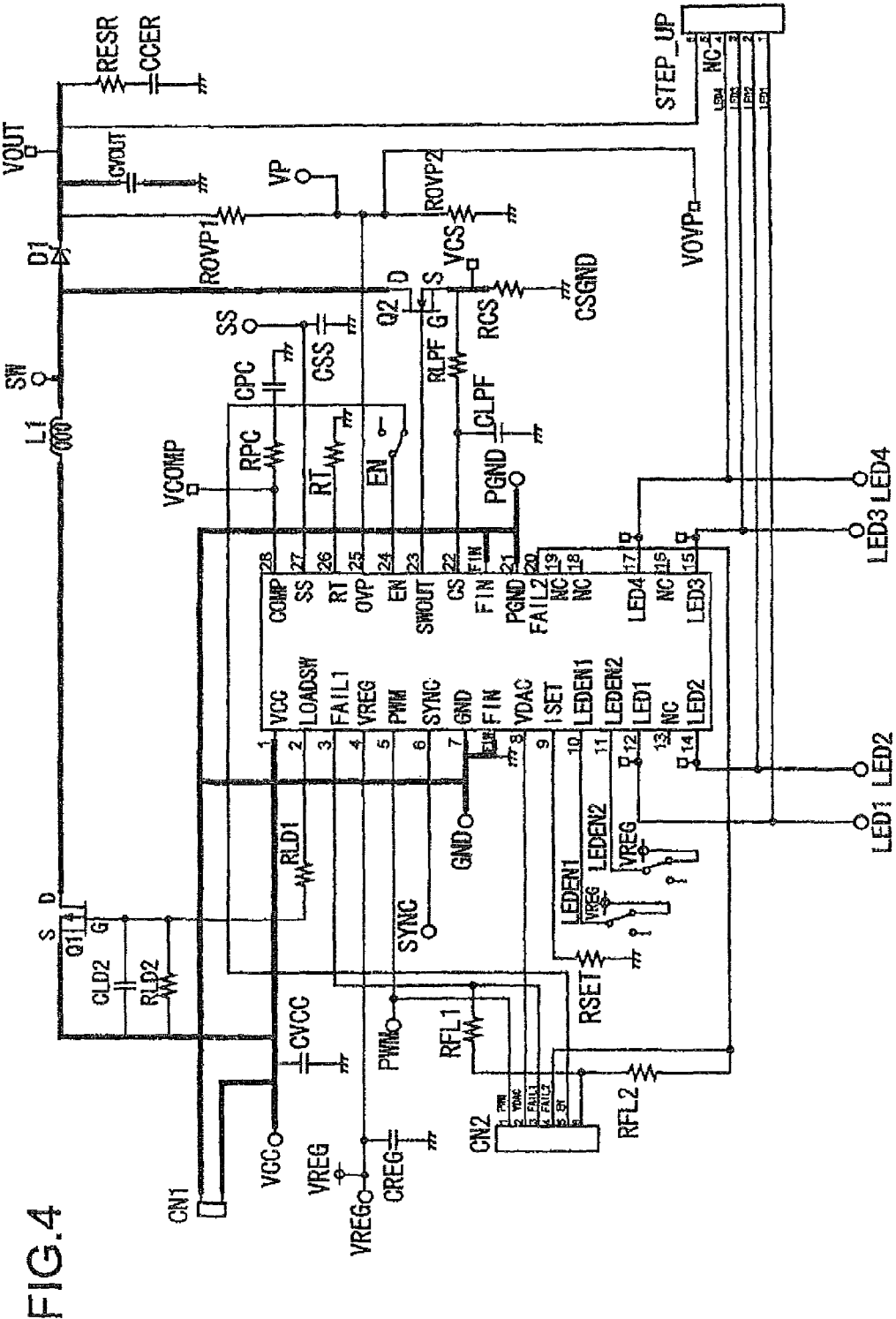
FIG. 4 is a diagram for describing external connections of the semiconductor device 10.

FIG. 4 is a diagram for describing the external connections of the semiconductor device 10.

As for external elements shown in FIG. 4, it is desirable that decoupling capacitors CVCC, CREG are connected as close to IC pins as possible.

Because a large current is likely to flow in a CS terminal (22nd pin), a GND terminal (7th pin) and a PGND (21st pin), it is desirable to separately wire them and lower the impedances.

It is necessary to make sure that noise does not appear on a VDAC terminal (8th pin), an ISET terminal (9th pin), a RT terminal (26th pin) and a COMP terminal (28th pin).

It is necessary to make sure that a PWM terminal (5th pin), a SYNC terminal (6th pin), a LED1 terminal (12th pin), a LED2 terminal (14th pin), a LED3 terminal (15th pin) and a LED4 terminal (17th pin) do not influence patterns around them because they are switched.

It is desirable that thick-line portions in FIG. 4 are designed with wide patterns and a layout as short as possible.

Here, in the semiconductor 10 according to the present embodiment, because a power transistor Q2 is externally connected, it becomes possible to raise heat radiation.

FIG. 5 is a setting table showing examples of constants of external elements. Here, the constants shown as examples in this figure are constants whose operations are confirmed at the power-supply voltage VCC=12[V], LED 5 in series and 4 in parallel, the output current ILED=50[mA]. Accordingly, because the optimum values are different depending on use conditions and the like, it is desirable to decide on the constants after a sufficient evaluation.

Figure 6:
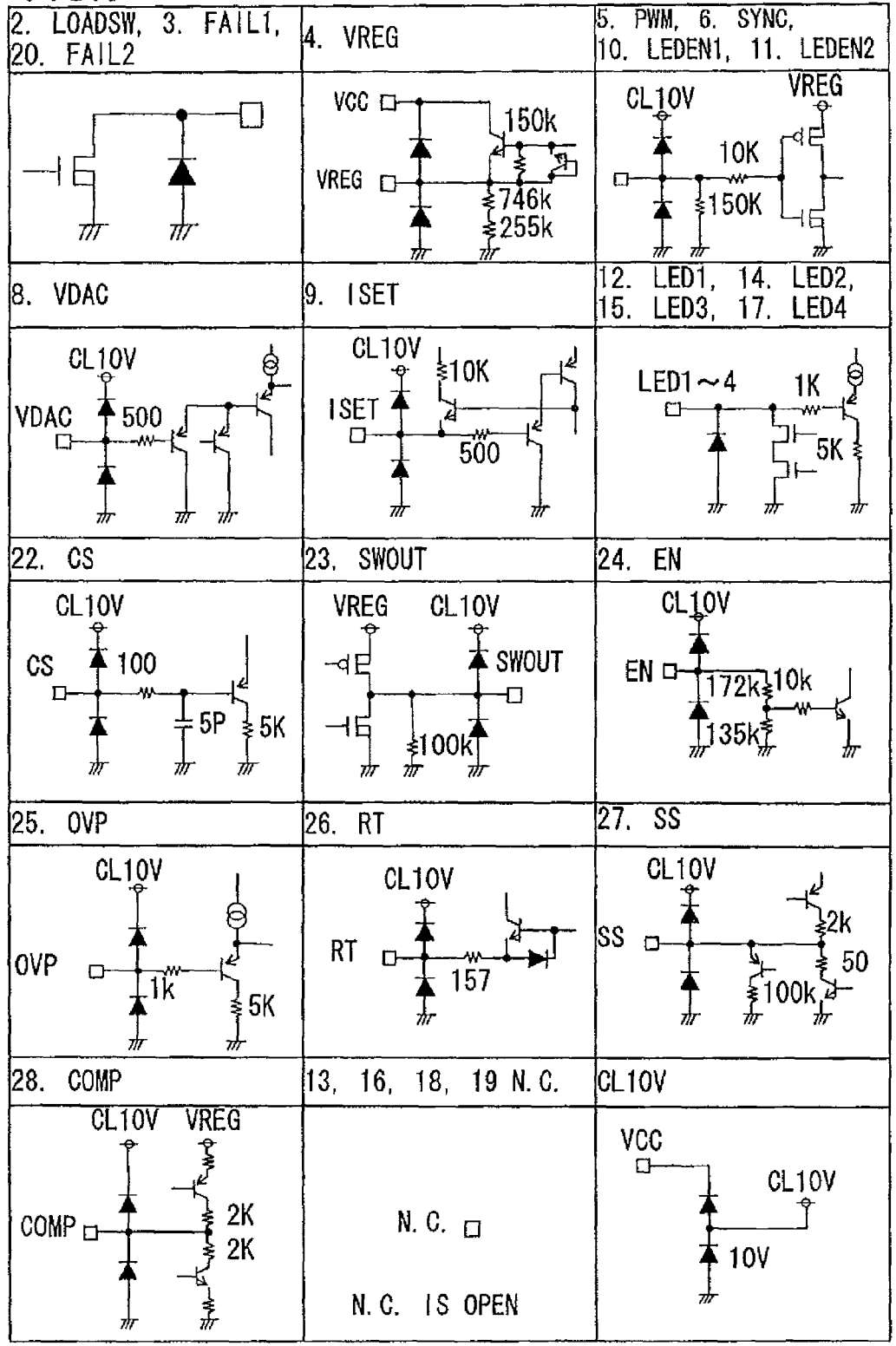
FIG. 6 is an input/output equivalent circuit diagram of external terminals.

FIG. 6 is an input/output equivalent circuit diagram of the external terminals.

As shown in FIG. 6, electrostatic protection diodes are connected with all the external terminals of the semiconductor device 10.

Besides, as for the PWM terminal (5th pin), SYNC terminal (6th pin), VDAC terminal (8th pin). ISET terminal (9th pin), LEDEN1 terminal (10th pin), LEDEN2 terminal (11th pin), CS terminal (22nd pin), SWOUT terminal (23rd pin), EN terminal (24th pin), OVP terminal (25th pin), RT terminal (26th pin), SS terminal (27th pin), COMP terminal (28th pin) that are control related terminals, a structure is employed, in which the cathodes of electrostatic diodes on the upper sides (on a route side where electric charges are pulled out from a signal line to a power-supply line) are not connected with application terminals of the reference voltage VREG and the power-supply voltage VCC but with an application terminal of an intermediate voltage CL10V (e.g, 10[V]; see the most right below of FIG. 6).

According to such structure, in a case where the power-supply voltage VCC is not applied, or in a case where the reference voltage VREG is not generated by an enable signal EN, even if a positive voltage is applied to an external terminal, an overcurrent does not flow in the reference voltage line and the power-supply voltage line via an electrostatic protection diode, accordingly, it becomes possible to protect breakdown and erroneous operation of the circuit.

FIG. 7 is a table showing electric characteristics of the semiconductor device 10 that has the above structure. Here, the electric characteristics shown in FIG. 7 represent numerical values at the power-supply voltage VCC=12 [V], ambient temperature Ta=25[° C.] unless otherwise specified.

Next, detailed description of the VREG block (VREG portion 101) of the semiconductor device 10 is performed with reference to the above FIG. 1 and the like.

The VREG portion 101 is a means that generates the reference voltage VREG (5[V] (Typ.)) from the power-supply voltage VCC (12[V]) input into the VCC terminal (1st pin) when the enable signal EN input into the EN terminal (24th pin) is in a high level. This reference voltage VREG is used as a power supply for an internal circuit and also used to fix a terminal at a high-level voltage outside the IC.

Besides, the VREG portion 101 includes a UVLO function, begins operation at 2.9[V] (Typ.) or higher, and stops the operation at 2.8[V] (Typ.) or lower.

Here, the VREG terminal (4th pin) is an external terminal to connect the capacitance GREG (10 μF (Typ.)) for phase compensation. By connecting such capacitance GREG for phase compensation, it becomes possible to stabilize circuit operation of the VREG portion 101.

Next, detailed description of a self-diagnosis function of the semiconductor device 10 is performed.

The semiconductor device 10 according to the present embodiment, to represent an operation state of a protection circuit incorporated in itself, includes a function to output the FAIL1 signal and the FAIL2 signal in an open-drain fashion from the FAIL1 terminal (3rd pin) and the FAIL2 terminal (20th pin), respectively.

Figure 8:
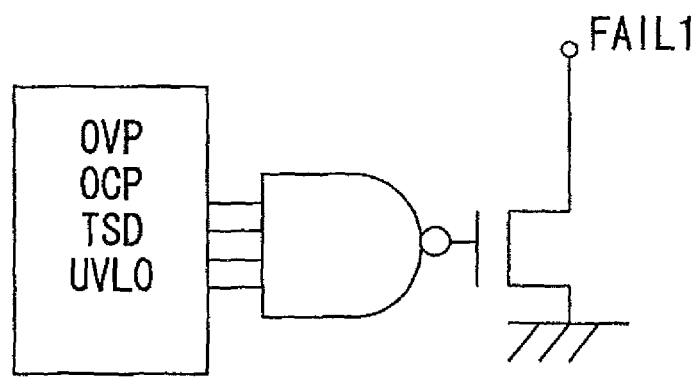
FIG. 8 is a diagram showing an output stage of a FAIL1 signal.

If any of the UVLO portion 103, TSD portion 104, OVP portion 105 and OCP portion 111 detects an abnormal state and the output signal is brought to a low level, the control logic portion 109 brings the FAIL1 signal to the low level via an output stage shown in FIG. 8 and fixes the SWOUT terminal (23rd pin) at the low level, thereby stopping the voltage step-up operation.

However, because the OCP portion 111 is of a pulse-by-pulse type, after the SWOUT terminal is fixed at the low level for only one period decided on by the oscillation frequency FOSC of the voltage step-up DC/DC converter, the voltage step-up operation is resumed. According to such pulse-by-pulse type, because it is possible to limit a current without completely stopping the circuit operation, automatic resumption is performed with no delay even if the circuit is stopped by erroneous operation, so that it is easy for the user to operate.

Besides, if at least one of the UVLO portion 103, TSD portion 104 and OVP portion 105 detects an abnormal state, all the LED1 terminal, LED2 terminal, LED3 terminal and LED4 terminal (12th pin, 14th pin, 15th pin, 17th pin) are opened (high impedance).

Besides, the FAIL1 signal output from the FAIL1 terminal (3rd pin) and the LOADSW signal output from the LOADSW terminal (2nd pin) are signals inverted from each other; if the FAIL1 signal is brought to the low level, the LOADSW signal is brought to the high level by means of the switch 102. Accordingly, if any of the UVLO portion 103, TSD portion 104, OVP portion 105 and OCP portion 111 detects an abnormal state, a load switch (the P-channel type field effect transistor Q1 in FIG. 4) that is externally connected with the LOADSW terminal (2nd pin) is turned off. Accordingly, in an abnormal time of the semiconductor device 10, the voltage step-up operation is stopped, so that it becomes possible to prevent the IC from being broken, emitting smoke, or burning.

Figure 9:
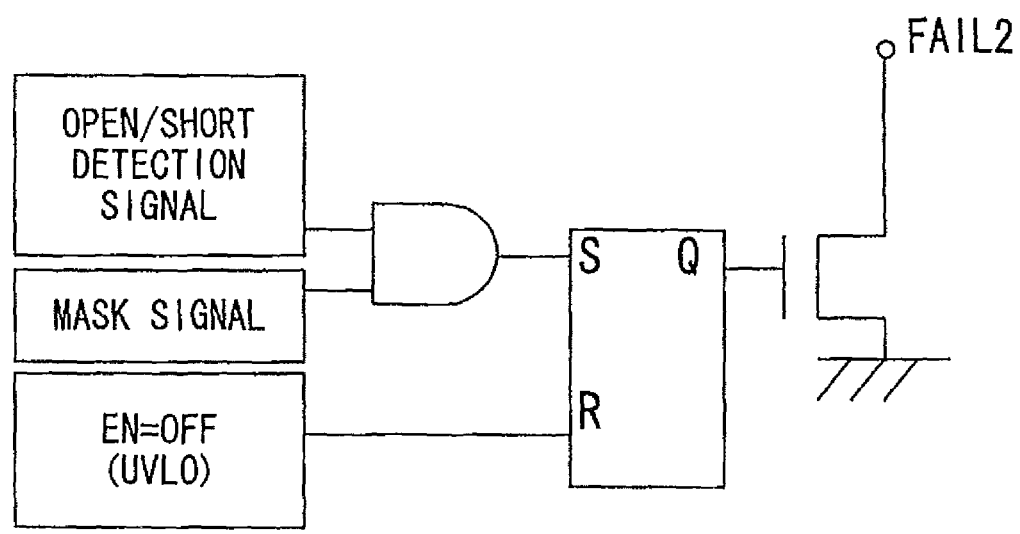
FIG. 9 is a diagram showing an output stage of a FAIL2 signal.

On the other hand, the FAIL2 signal output from the FAIL2 terminal (20th pin) is brought to the low-level output via an output stage shown in FIG. 9 if the open/short detection portion 118 detects an abnormal state (an open state or a short state). Here, the FAIL2 signal output from the open/short detection portion 118 is of a latch type, and release of the latch is performed based on on/off (and on/off of the UVLO signal) of the enable signal EN.

Figures 10, 11:
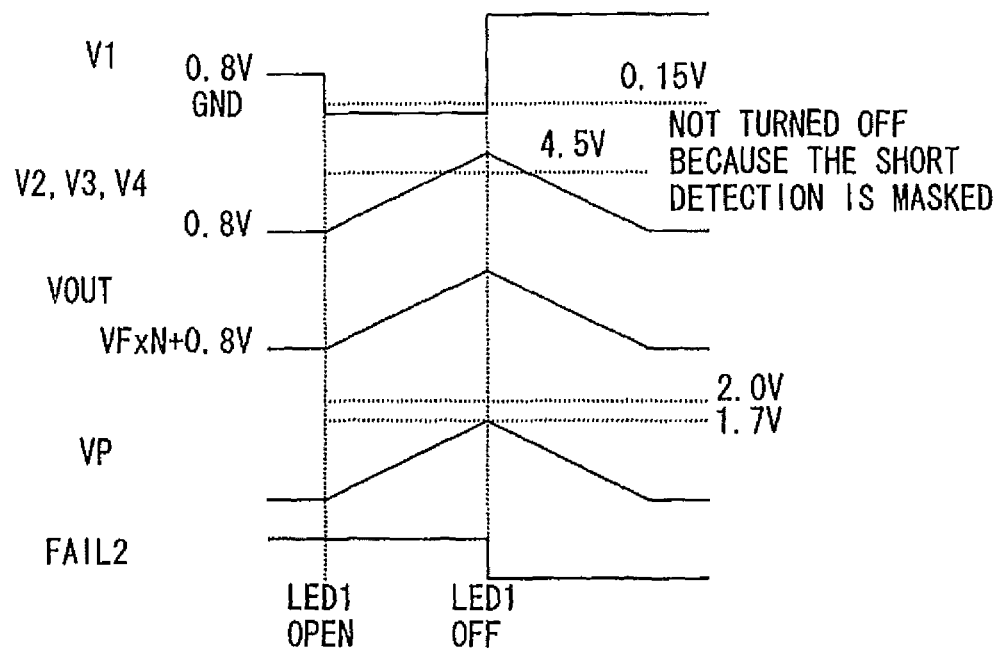
FIG. 10 is a diagram for describing an open/short detection operation.
FIG. 11 is a truth table showing a correlation between input logics of LED enable signals LEDEN1, LEDEN2 and on/off states of LED output terminals LED1 to LED4.

As shown in FIG. 10, if LED terminal voltages V1 to V4 (the respective terminal voltages of the LED1 terminal to LED4 terminal) that are to be maintained at a predetermined LED control voltage VLED (0.8 [V] (Typ.)) become 0.15 [V] (Typ.) or lower, the open/short detection portion 118 determines that the LED terminal is opened; further, if a terminal voltage VP (a divided voltage of an output voltage VOUT) of the OVP terminal (25th pin) reaches 1.7 [V] (Typ.), the open/short detection portion 118 transmits an instruction to the constant-current drive 117 so as to turn off a current output for the LED terminal that is judged to be opened and shifts the FAIL2 signal to the low level. Here, in the example in FIG. 10, a case where the LED1 terminal is opened is shown as an example.

As described above, by performing the open detection of the LED terminal and the off control of the electric-current output in a two-step fashion, it becomes possible to avoid an unnecessary shutdown.

Here, as for the above open detection, it is possible to substitute overvoltage detection by the OVP portion 105. Specifically, in the OVP portion 105, it is detected that the terminal voltage VP of the OVP terminal reaches a predetermined overvoltage detection voltage VDOVP (2.0 [V] (Typ.)); the voltage step-up operation of the DC/DC converter is stopped; and the electric-current outputs of all the channels are turned off; accordingly, without performing the open detection, it is possible to turn off the electric-current outputs of all the channels by performing the overvoltage detection that doubles as the open detection.

Here, to turn off only a channel that is opened, as described above, it is sufficient to identify the LED terminal that is opened and turn off only the channel by monitoring the TED terminal voltages V1 to V4. Especially, as for adaptation to an application (a backlight drive device for a car navigation monitor and the like) in which trouble occurs in the use if the electric-current outputs of all the channels are turned off, the structure according to the present embodiment that is able to separately turn off the electric-current outputs of the respective channels is desirable.

Besides, the open/short detection portion 118 determines that a short occurs if the LED terminal voltages V1 to V4 become 4.5 [V] (Typ.) or higher. In other words, if a difference between the LED terminal voltages in a normal time and an abnormal time becomes 3.7 [V] (=4.5 [V]–0.8 [V]) (Typ.) or higher, the short is detected.

Here, because a forward-direction drop voltage VF of the white LED is about 3.4 [V], in the above setting example, a short is not detected even if only one LED shorts; but a short is detected if two or more LEDs short. According to the setting of such a threshold level, it becomes possible to avoid an unnecessary shutdown within an extent where a LED short occurs but serious trouble is not caused in the use.

As described above, the short detection in the open/short detection portion 118 means a detection operation in which for example, one LED that constitutes any one of TED trains that are connected separately and externally with the LED1 terminal to LED4 terminal goes to a short state (a short-circuit state between the anode and the cathode); as a result of this, a forward-direction drop voltage of the entire LED train becomes low by the forward-direction drop voltage VF of the LED that goes to the short state, so that a state in which one LED terminal voltage becomes higher than the other LED terminal voltages by the forward-direction drop voltage VF of the LED is detected. Accordingly, as shown in FIG. 1, the open/short detection portion 118 and the OVP portion 105 are formed as protection blocks separate from each other.

Here, in the semiconductor device 10 according to the present embodiment, if an open/short is detected, thereafter, the short detection signal is masked. Describing with reference to the example in FIG. 10, after an open of the LED1 terminal is detected, the short detection signals of the other LED2 terminal to LED4 terminal are masked. According to such mask control, as a result of the fact that the LED1 terminal is opened, even in a case where the LED terminal voltage V1 drops almost to the GND, in response to this, the output voltage VOUT rises; by following this, the LED terminal voltages V2 to V4 rise higher than usual, this is not erroneously detected as a short. Here, the open detection signal is not masked even after the open/short detection.

Besides, the above short detection signal is also masked in an off time of the output current ILED by the PWM drive. According to such mask control, even if the TED terminal voltages V1 to V4 leap in an off time of the output current WED, this is not erroneously detected as a short. As for the above mask control, considering that a delay between the logic-shift timing of the PWM signal and the on/off timing of the output current ILED occurs, it is sufficient to mask from the timing of starting to flow the output current ILED (the timing the output transistor of the constant-current driver 117 is turned on) to the timing the PWM signal falls to the low level (see FIG. 13 later described).

Besides, if additional capacitance is connected with the LED1 terminal to LED4 terminal, the LED terminal voltages V1 to V4 become slow to drop and the short detection can malfunction; accordingly, it is necessary to take care. Besides, because both FAIL1 signal and FAIL2 signal are of the open-drain type, the FAIL1 terminal and the FAIL2 terminal are pulled up to the application terminal of the reference voltage VREG via resistors (resistors RFL1, RFL2 in FIG. 4).

Next, detailed description of the current driver block (the input buffer 115, current set portion 116, constant-current driver 117, open/short detection portion 118 and input buffers 119 and 120) of the semiconductor device 10 is performed.

Of the LED output terminals LED1 to LED4, if there is an output terminal (and a train of LEDs that do not go on) that does not use the output current ILED from the constant-current driver 117, it is possible to separately turn off the electric-current outputs for the LED output terminals LED1 to LED4 by using the LEDEN1 terminal (10th pin) and the LEDEN2 terminal (11th pin).

FIG. 11 is a truth table showing a correlation between input logics of LED enable signals LEDEN1, LEDEN2 and on/off states of the TED output terminals LED1 to LED4.

Here, if a LED terminal that is not used is opened without using the LED enable signals LEDEN1, LEDEN2, the open detection malfunctions in the open/short detection portion 118. Besides, even if the electric-current output for the LED terminal is turned off by using the LED enable signals LEDEN1, LEDEN2, the input stage of the error amplifier 113 operates; accordingly, it is desirable that the LED1 terminal to LED4 terminal are not fixed to the GND but opened or connected with the application terminal of the constant voltage VREG. Besides, when the output current ILED is PWM-driven, it is desirable not to switch the LED enable signals LEDEN1, LEDEN2.

Next, a method for setting the output current MED is described in detail with reference to FIG. 12.

Figure 12:
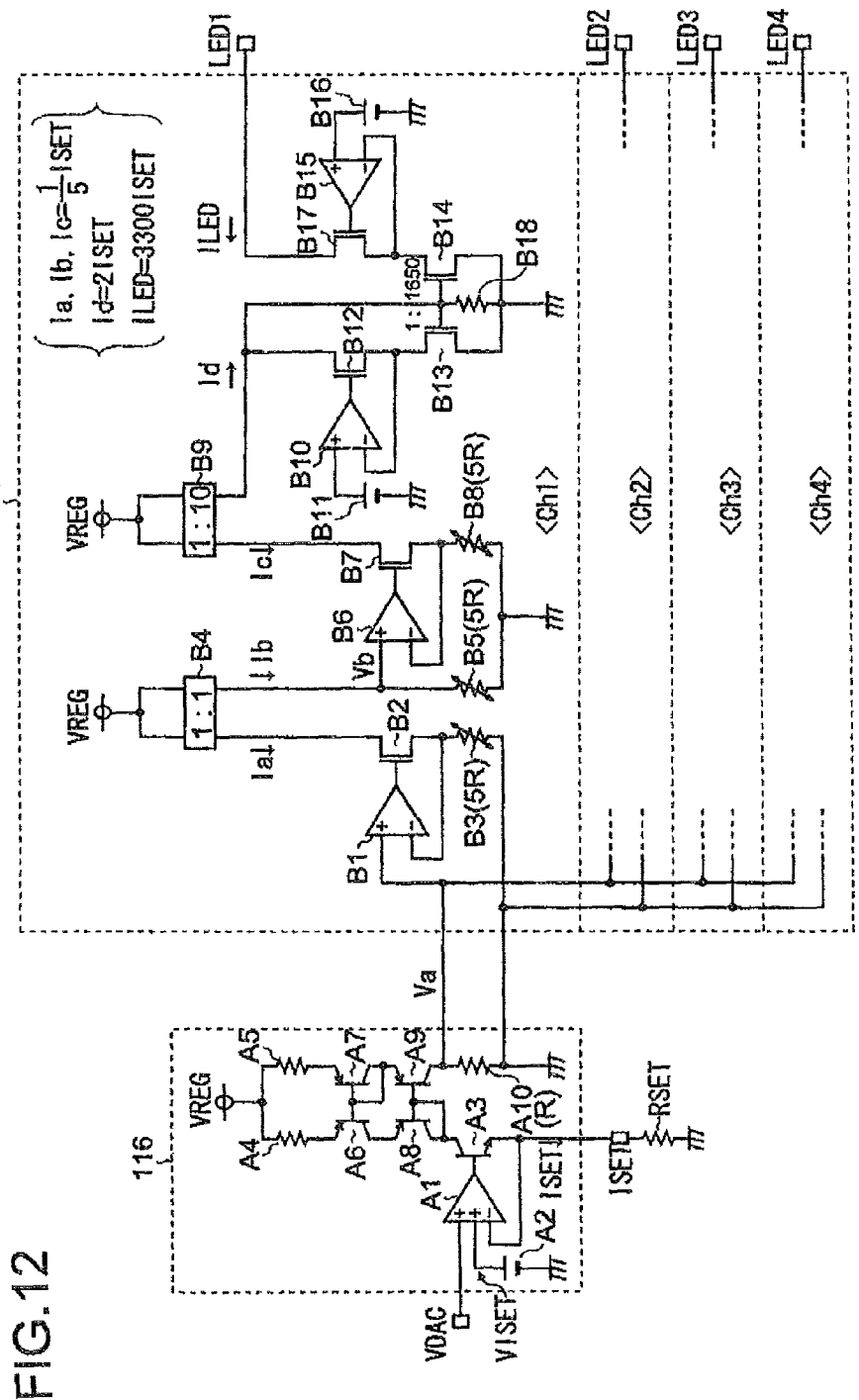
FIG. 12 is a circuit diagram showing structural examples of a current set portion 116 and a constant-current driver 117.

FIG. 12 is a circuit diagram showing structural examples of the current set portion 116 and the constant-current driver 117.

As shown in FIG. 12, the current set portion 116 includes: an operational amplifier A1; a direct-current voltage source A2; an npn-type bipolar transistor A3; resistors A4, A5; pnp-type bipolar transistors A6 to A9; and a resistor A10 (the resistance value R).

A first non-inverting input terminal (+) of the operational amplifier A1 is connected with the VDAC terminal (8th pin). A second non-inverting input terminal (+) of the operational amplifier A2 is connected with a positive-polar terminal of the direct-current voltage source A2, and a predetermined constant voltage VISET (=2.0 [V]) is applied. A negative-polar terminal of the direct-current voltage source A2 is connected with a ground terminal. An inverting input terminal (−) of the operational amplifier A2 is connected with the ISET terminal (9th pin). A base of the transistor A3 is connected with an output terminal of the operational amplifier A1. An emitter of the transistor A3 is connected with the ISET terminal.

One terminal of each of the resistors A4, A5 is connected with the application terminal of the reference voltage VREG. The other terminal of the resistor A4 is connected with an emitter of the transistor A6. The other terminal of the resistor R5 is connected with an emitter of the transistor A7. Bases of the transistors A6, A7 are connected with each other and the connection node is connected with a collector of the transistor A7. A collector of the transistor A6 is connected with an emitter of the transistor A8. The collector of the transistor A7 is connected with an emitter of the transistor A9. Bases of the transistors A8, A9 are connected with each other and the connection node is connected with a collector of the transistor A8. The collector of the transistor A8 is connected with the collector of the transistor A3. A collector of the transistor A9 is connected with the ground terminal via the resistor A10.

On the other hand, as shown in FIG. 12, the constant-current driver 117 includes 4 channels of output stages Ch1, Ch2, Ch3 and Ch4 that supply the output current MED to the LED1 terminal to LED4 terminal, respectively. Here, the output stage Ch1 includes: an operational amplifier B1; an N-channel type field effect transistor B2; a resistor B3 (the resistance value 5R); a current mirror circuit B4 (the mirror ratio 1:1); a resistor B5 (the resistance value 5R); an operational amplifier B6; an N-channel type field effect transistor B7; an resistor B8 (the resistance value 5R); a current mirror circuit B9 (the mirror ratio 1:10); an operational amplifier B10; a direct-current voltage source B11; N-channel type field effect transistors B12 to B14; an operational amplifier B15; a direct-current voltage source B16; an N-channel type field effect transistor B17; and a resistor B18.

A non-inverting input terminal (+) of the operational amplifier B1 is connected the connection node of the transistor A9 and the resistor A10. An inverting input terminal (−) of the operational amplifier B1 is connected with one terminal of the resistor B3. The other terminal of the resistor B3 is connected with the ground terminal. A drain of the transistor B2 is connected with an input terminal of the current mirror circuit B4. A source of the transistor B2 is connected with one terminal of the resistor B3. A gate of the transistor B2 is connected with an output terminal of the operational amplifier B1. A power-supply input terminal of the current mirror circuit B4 is connected with the application terminal of the reference voltage VREG.

A non-inverting input terminal (+) of the operational amplifier B6 is connected with an output terminal of the current mirror circuit B4 and with one terminal of the resistor B5. An inverting input terminal of the operational amplifier B6 is connected with one terminal of the resistor B8. Both of the other terminals of the resistors B5, B8 are connected with the ground terminal. A drain of the transistor B7 is connected with an input terminal of the current mirror circuit B9. A source of the transistor B7 is connected with one terminal of the resistor B8. A gate of the transistor B7 is connected with an output terminal of the operational amplifier B6. A power-supply input terminal of the current mirror circuit B9 is connected with the application terminal of the reference voltage VREG.

A non-inverting input terminal (+) of the operational amplifier B10 is connected with a positive-polar terminal of the direct-current voltage source B11. A negative-polar terminal of the direct-current voltage source B11 is connected with the ground terminal. A drain of the transistor B12 is connected with an output terminal of the current mirror circuit B9. A source of the transistor B12 is connected with an inverting input terminal (−) of the operational amplifier B10. A gate of the transistor B12 is connected with an output terminal of the operational amplifier B10.

A drain of the transistor B13 is connected with the source of the transistor B12. Gates of the transistors B13, B14 are connected with each other and the connection node is connected with the drain of the transistor B12 and also connected with the ground terminal via the resistor B18. Both sources of the transistors B13, B14 are connected with the ground terminal.

A non-inverting input terminal (+) of the operational amplifier B15 is connected with a positive-polar terminal of the direct-current voltage source B16. A negative-polar terminal of the direct-current voltage source B16 is connected with the ground terminal. A drain of the transistor B17 is connected with the LED1 terminal. A source of the transistor B17 is connected with an inverting input terminal (−) of the operational amplifier B15 and also connected with a drain of the transistor B14. A gate of the transistor B17 is connected with an output terminal of the operational amplifier B15.

Here, because the other output stages Ch2 to Ch4 that constitute the constant-current driver 117 include the same structure as that of the above output stage Ch1, detailed description of them is skipped.

In the current set portion 116 and the constant-current driver 117 that have the above structures, the output current ILED is set based on the following formula (1).

$$\text{ILED[mA]} = \min\{\text{VDAC}, 2.0\ [\text{V}]\}/\text{RSET[k}\Omega]\times 3300 \quad (1)$$

In the above formula (1), a parameter min {VDAC, 2.0 [V]} is a voltage value that is the lower of the control voltage VDAC input into the VDAC terminal (8th pin) and the constant voltage VISET (=2.0 [V]) predetermined in the current set portion 116. Besides, a parameter RSET is a resistance value of the resistor RSET that is externally connected with the ISET terminal (9th pin); and a parameter 3300 (Typ.) is a constant that is decided on in the constant-current driver 117.

Specifically, the resistor RSET is pulldown-connected with the ISET terminal (9th pin), so that an electric current predetermined-gain times (e.g., 3300 times) larger than the reference current ISET flowing in this is set as the maximum value (e.g., 50 [mA]) of the output current ILED.

Describing with reference to the example in FIG. 12, in the constant-current driver 117, first, by using the operational amplifier B1, transistor B2 and resistor B3 (the resistance value 5R), a terminal voltage Va (=ISET×R) of the resistor A10 is voltage/current-converted to generate an intermediate current Ia (=⅕ISET) that is ⅕ the reference current ISET. Next, by using the current mirror circuit B4, the intermediate current Ia is mirrored at 1:1 to generate an intermediate current Ib (=⅕ISET). Next, by using the resistor B5 (the resistance value 5R), the intermediate current Ib is current/voltage-converted to generate a terminal voltage Vb (=ISET×R). Next, by using the operational amplifier B6, transistor B7 and resistor B8 (the resistance value 5R), the terminal voltage Vb of the resistor B5 is voltage/current-converted to generate an intermediate current Ic (=⅕ISET). Next, by using the current mirror circuit B9, the intermediate current Ic is mirrored at 1:10 to generate an intermediate current Id (=2ISET) that is two times as large as the reference current ISET. And, finally, by using the current mirror circuit that includes the transistors B13, B14, the intermediate current Id is mirrored at 1:1650 to generate the output current ILED (=3300ISET) that is 3300 times as large as the reference current ISET.

Here, to raise accuracy of the output current ILED, in the last-stage current mirror circuit, by using the operational amplifiers B10, B15, drain-source voltages of the transistors B13, B14 are made identical to each other (e.g., 0.3 [V]). Besides, the constant-current driver 117 is so structured as to generate the desired output current ILED by repeating the voltage/current conversion and the current/voltage conversion based on the input reference current ISET. Accordingly, the number of resistor elements (the resistors B3, B5 and B8 in the example in FIG. 12) used for the above conversion processes increases and trimming chances increase. As described above, according to the structure including many resistors that are able to be trimmed, by finely adjusting the resistance values, it is possible to achieve a relative uneven width of ±4% and an absolute uneven width of ±6%, which is able to contribute to reduction in the brightness unevenness and to longevity of the LED.

Figure 13:
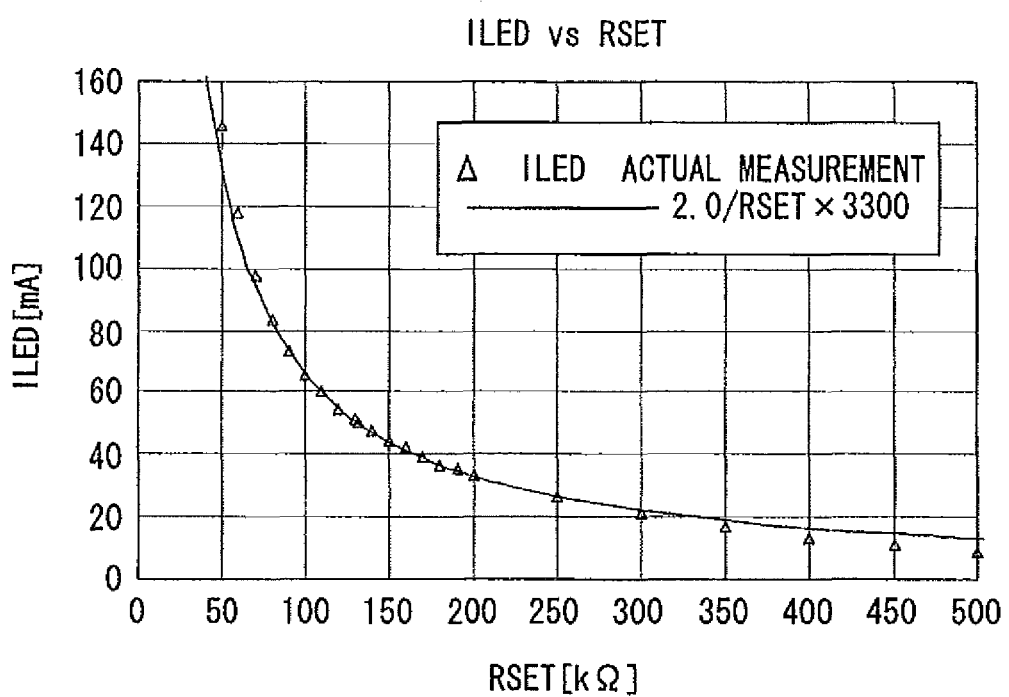
FIG. 13 is a graph showing a correlation between a resistor RSET and an output current ILED.

FIG. 13 is a graph showing a correlation between the resistor RSET and the output current FLED. Here, it is desirable to use a resistor having 300 [kΩ] or smaller as the resistor RSET.

Besides, in a case where variable control (light control of the LED) of the output current ILED is performed by using the above control voltage VDAC, it is sufficient to set the input range at a range of 0.1 to 2.0 [V]. By applying such control voltage VDAC, it becomes possible to decrease the output current ILED from the maximum value.

On the other hand, in a case where 2.0 [V] or higher is input as the control voltage VDAC, as given by the above formula (1), the voltage value of the constant voltage VISET is selected; accordingly, the light control function by the control voltage VDAC is not used. Here, in a case where the light control by the control voltage VDAC is not used, from the viewpoint of avoidance of malfunction, it is sufficient not to open the VDAC terminal but connect it with the application terminal of the reference voltage VREG (5 [V]).

In addition, in the semiconductor device 10 according to the present embodiment, besides the light control of the TED that uses the above control voltage VDAC, by using the PWM signal input into the PWM terminal (5th pin), the on/off control of the reference current ISET is performed, so that it is also possible to perform the light control of the LED.

Specifically, based on the PWM signal, if a pulse current is generated as the reference current ISET that serves as the reference for the output current ILED, the duty ratio of the PWM signal becomes the duty ratio of the output current ILED; accordingly, it becomes possible to seemingly decrease the output current ILED from the maximum value (or a current value decided on by the control voltage VDAC). Here, it is sufficient to dispose an on/off control means (a pulse current generation means) for the reference current ISET based on the PWM signal in the output stage (the previous stage of the constant-current driver 117) of the current set portion 116.

Besides, in the semiconductor device 10 according to the present embodiment, to raise response of the output current ILED to the PWM signal, a pull-down resistor B18 (500 [kΩ]) is inserted between the gate and the source of each of the transistors B13, B14 in the last-stage current mirror circuit. According to such insertion of the pull-down resistor B18, because it is possible to speed up the rising of the transistors B13, B14, it becomes possible to achieve increase (at the minimum duty ratio of 0.38[%] (150 [Hz])) in the PWM light control capability.

On the other hand, in a case where the light control by the PWM signal is not used (the duty ratio is 100%), it is sufficient to fix the PWM terminal at the high level (e.g., the constant voltage VREG). Here, it is desirable to insert a low pass filter (a cut-off frequency of 30 [kHz]) into the PWM terminal.

Figure 14A:
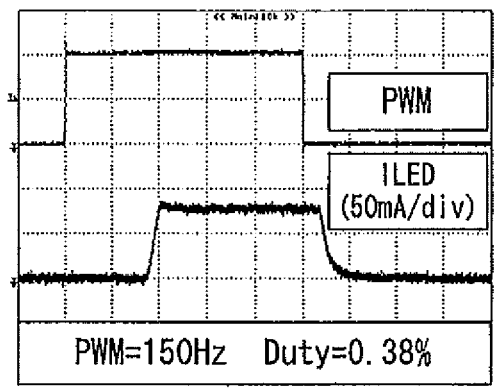
FIG. 14A is a timing chart showing an example of PWM light control (PWM=150 Hz, Duty=0.38%).
Figure 14B:
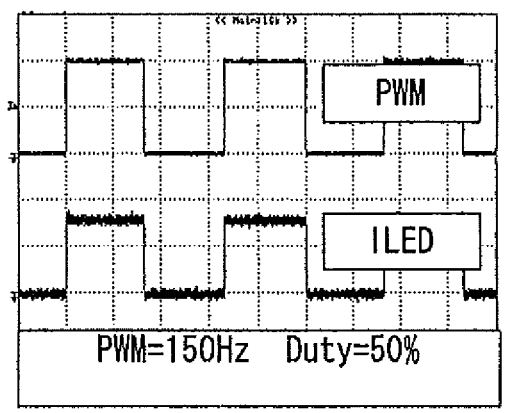
FIG. 14B is a timing chart showing an example of PWM light control (PWM=150 Hz, Duty=50%).
Figure 14C:
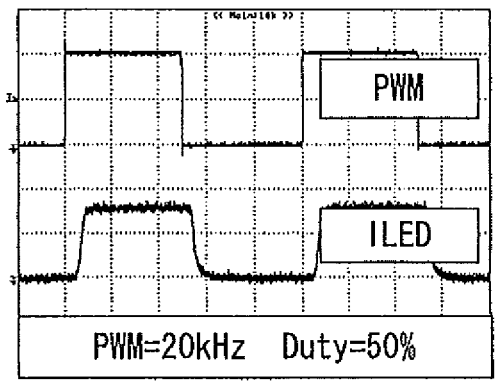
FIG. 14C is a timing chart showing an example of PWM light control (PWM=20 KHz, Duty=50%).

FIGS. 14A to 14C are timing charts showing examples of the PWM light control, and each show a correlation between the PWM signal and the output current ILED. Here, FIG. 14A shows a case where the PWM signal has a frequency of 150 [Hz] and a duty ratio of 0.38[%]; FIG. 14B shows a case where the PWM signal has a frequency of 150 [Hz] and a duty ratio of 50[%]. And, FIG. 14C shows a case where the PWM signal has a frequency of 20 [kHz] and a duty ratio of 50[%]. Here, although all the horizontal axes of FIGS. 14A, 14B and 14c are each a time axis, the frequencies of the PWM signal are extremely different from each other; accordingly, the representing ranges are different from each other. Usually, the frequency of the PWM signal is set fixedly at about 100 to 200 [Hz].

Next, a voltage step-up DC/DC controller block of the semiconductor device 10 (a circuit block that includes: the input buffer 106; oscillator portion 107; PWM comparator 108; control logic portion 109; driver 110; OCP portion 111; comparator 112; error amplifier 113 and soft start portion 114) is described in detail.

First, basic operation (voltage step-up operation) of the voltage step-up DC/DC controller block is described in detail with reference to the above FIGS. 1 and 4.

The transistor Q2 is an N-channel field effect type output power transistor that is on/off-controlled depending on an output from the SWOUT terminal (23rd pin).

If the transistor Q2 is brought into the on state, a switch current flows in the coil L1 to the ground terminal via the transistor Q2 and its electric energy is stored. Here, in a case where electric charges are already accumulated in the output capacitor CVOUT in an on time of the transistor Q2, a current from the output capacitor CVOUT flows into a train of light emitting diodes that are loads (a train of LEDs connected between a lead-out terminal of the output voltage VOUT and the LED1 terminal to LED4 terminal, which is not shown in FIG. 4, though). Besides, here, because an anode potential of the diode D1 drops to almost the ground potential via the transistor Q2, the diode D1 goes into a backward bias state and a current does not flow from the output capacitor CVOUT to the transistor Q2.

On the other hand, if the transistor Q2 is brought into the off state, the electric energy accumulated there is discharged by a backward voltage generated in the coil L1. Here, because the diode D1 goes to a forward bias state, the current flowing via the diode D1 flows into the TED train that is the load and into the ground terminal as well via the output capacitor CVOUT, thereby charging the output capacitor CVOUT. The above operation is repeated, so that the TED train, that is, the load, is stepped up in voltage by the output capacitor CVOUT and the smoothed output voltage VOUT is supplied.

As described above, the semiconductor device 10 according to the present embodiment functions as a constituent component of a chopper-type voltage step-up circuit that drives the coil L1 that is an energy storage element by the on/off control of the transistor Q2, thereby stepping up the power-supply voltage VCC to generate the output voltage VOUT.

Next, output feedback control of the voltage step-up DC/DC controller block is described in detail.

The error amplifier 113 amplifies a difference between the smallest value of the LED terminal voltages V1 to V4 applied respectively to the first to fourth inverting input terminals (−) and the predetermined LED control voltage VLED input into the non-inverting input terminal (+), thereby generating an error voltage Verr. In other words, the voltage value of the error voltage Verr goes to a higher level as the output voltage VOUT becomes lower than its target set value.

On the other hand, the PWM comparator 108 compares the lower of the error voltage Verr and an upper limit voltage Vlmt respectively applied to the first and second non-inverting input terminals (+) with a triangular-wave voltage (lamp-wave voltage) Vosc applied to the inverting input terminal (−), thereby generating a comparison signal (PWM drive waveform) having a duty depending on the comparison result. In other words, the logic of the comparison signal goes to the high level if the error voltage Verr (or the upper limit voltage Vlmt) is higher than the triangular-wave voltage Vosc and goes to the low level if the error voltage Verr (or the upper limit voltage Vlmt) is lower than the triangular-wave voltage Vosc.

Accordingly, the on duty (the ratio of an on time of the transistor Q2 per unit time) of the comparison signal in a steady operation time changes depending on a relative height difference between the error voltage Verr and the triangular-wave voltage Vosc.

During a time the above comparison signal is maintained at the high level, the control logic portion 109 holds the terminal voltage (i.e., the gate voltage of the transistor Q2) of the SWOUT terminal at the high level via the driver 110. Accordingly, the transistor Q2 is brought into the on state. On the other hand, during a time the comparison signal is maintained at the low level, the terminal voltage of the SWOUT terminal is held at the low level. Accordingly, the transistor Q2 is brought into the off state.

As described above, the voltage step-up DC/DC controller block is so structured as to perform the drive control of the transistor Q2 based on monitoring results of the LED terminal voltages V1 to V4 (and the output voltage VOUT). Accordingly, it becomes possible to maintain the output voltage VOUT at a predetermined value.

Next, the series number of the TED train that is the load is described.

As described above, the voltage step-up DC/DC controller block of the semiconductor device 10 detects the cathode voltage (i.e., the LED terminal voltages V1 to V4) of the LED train and controls the output voltage VOUT applied to the anode of the LED train so as to allow the cathode voltage to become the LED control voltage VLED (=0.8 [V] (Typ.)).

The above voltage step-up operation is performed only when the PWM signal is in the high level and the output current MED is flown into the LED train. Beside, when a plurality of TED trains are driven, the LED terminal voltage (in other words, the smallest value of the LED terminal voltages) of the LED train that has the largest forward-direction drop voltage VF of the LED is so controlled as to become identical to the LED control voltage VLED Accordingly, the LED terminal voltages of the other trains of LED terminal voltages become a voltage that is higher by a difference in the forward-direction drop voltage VF.

Here, a difference allowable voltage Vper (=3.7 [V] (Typ.)) of the forward-direction drop voltage VF is set by the following formula (2) based on a short detection voltage VDSHT (=4.5 [V] (Typ.)) and the LED control voltage VLED (=0.8 [V] (Typ.)).

$$Vper = VDSHT - VLED \qquad (2)$$

Besides, in detecting an open by the open/short detection portion 118, 85% of an overvoltage detection reference voltage VDOVP (=2.0 [V] (Typ.)) is set as a trigger voltage (open detection voltage VDOP2 (=1.7 [V] (Typ.)) (see FIGS. 7 and 10). When this is converted into the output voltage VOUT, the maximum value of the output voltage VOUT in the usual operation time becomes 30.6 [V]=36 [V]×0.85. Accordingly, the series number N of the LED is limited so as to make the series number N smaller than a value that is obtained by dividing the maximum value 30.6 [V] of the output voltage VOUT by the forward-direction drop voltage VF of one LED.

Next, the OVP portion 105 is described. A divided voltage VP obtained by resistance-dividing the output voltage VOUT is input into the OVP terminal (25th pin). As described above, based on the series number N of the LED train and on the difference allowable voltage Vper of the forward-direction drop voltage VF, it is sufficient to suitably decide on the overvoltage detection reference voltage VDOVP of the OVP portion 105 that is compared with this. Besides, in deciding on the overvoltage detection reference voltage VDOVP, it should be decided on considering the open detection voltage VDOP2 (=VDOVP×0.85) as well. Here, after the OVP portion 105 starts once the protection operation, the protection operation is released when the output voltage VOUT decreases to 77.5% of the overvoltage detection reference voltage VDOVP.

For example, in a case where the resistance values of the resistance division circuit are ROVP1 (on the voltage step-up side), ROVP2 (on the GND side), when the output VOUT meets the following formula (3), the protection operation of the OVP portion 105 starts.

$$VOUT \geq \frac{(ROVP1 + ROVP2)}{ROVP2} \times VDOVP \qquad (3)$$

Here, when ROVP1=330 [kΩ], ROVP2=22 [kΩ], and VDOVP=2.0 [V], the protection operation of the OVP portion 105 starts at VOUT=32 [V] or higher Next, the oscillation frequency FOSC of the voltage step-up DC/DC converter is described. By externally connecting a pull-down resistor RT with the RT terminal (26th pin), charge and discharge currents for an internal capacitor of the oscillator portion 107 are decided on and it is possible to set the oscillation frequency FOSC of the triangular-wave voltage Vosc. The resistance value of the pull-down resistor RT externally connected with the RT terminal may be set in view of the following formula (4) and FIG. 15, and a range of 62.6 to 523 [kΩ] is desirable.

$$FOSC[\mathrm{kHz}] = \frac{30 \times 10^6}{RT[\Omega]} \times \alpha \qquad (4)$$

Here, in the above formula (4), 30×10⁶ [V/A/S] is a constant (±16.6%) that is decided on inside the circuit, and a is α correction coefficient (RT: α=50 [kΩ]: 0.98, 60 [U]: 0.985, 70 [kΩ]: 0.99, 80 [kΩ]: 0.994, 90 [kΩ]: 0.996, 100 [kΩ]: 1.0, 150 [kΩ]: 1.01, 200 [kΩ]: 1.02, 300 [kΩ]: 1.03, 400 [kΩ]1.04, 500 [kΩ]: 1.045).

Figure 15:
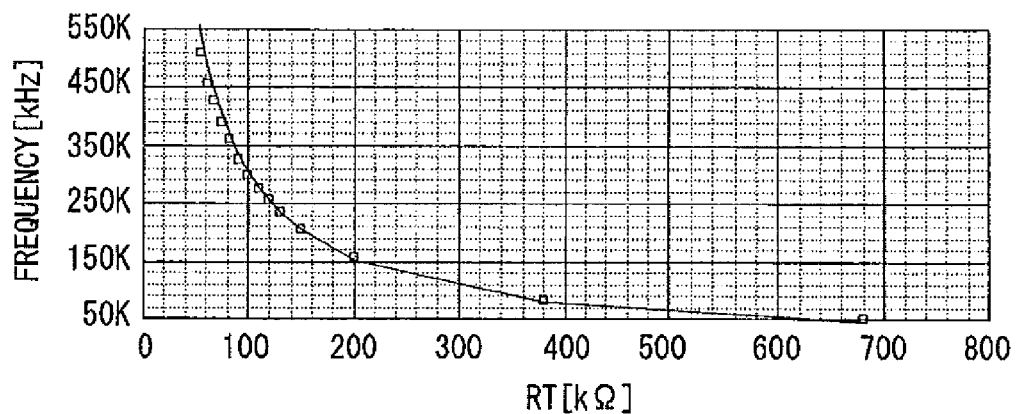
FIG. 15 is a graph showing a correlation between a resistor RT and an oscillation frequency FOSC.

Besides, in the setting outside the frequency range in FIG. 15, it is necessary to take care because the switching is likely to stop.

Next, an external synchronization oscillation frequency FSYNC is described. When a clock for external synchronization is input into the SYNC terminal (6th pin) of the voltage step-up DC/DC converter, it is better not to perform operations such as switching to internal oscillation and the like during the manipulation. After the input logic of the SYNC terminal is switched from the high level to the low level, it takes a delay time of about 30 [μsec] (Typ.) until an internal oscillation circuit starts to operate. The clock input into the SYNC terminal is valid at only the rising edge. Besides, in a case where the external input frequency is lower than the internal oscillation frequency, because after the above delay time, the internal oscillation circuit starts to operate, such an input should be avoided.

As described above, in the semiconductor device 10 according to the present embodiment, by using the RT terminal or the SYNC terminal, it is possible to perform variable control of the oscillation frequency FOSC of the voltage step-up DCDC converter block arbitrarily and with great accuracy. For example, in a case where the semiconductor device 10 according to the present embodiment is used as a backlight control means for a car navigation monitor, it is possible to avoid the oscillation frequency FOSC of the voltage step-up DC/DC converter overlapping the frequency band of radio noise by suitably setting the external synchronization oscillation frequency FSYNC from the SYNC terminal matching the switching control of a radio reception frequency; accordingly, it becomes possible to perform the backlight control of the car navigation monitor without deteriorating the reception quality of radio.

Next, the OCP portion 111 is described with reference to FIG. 16.

Figure 16:
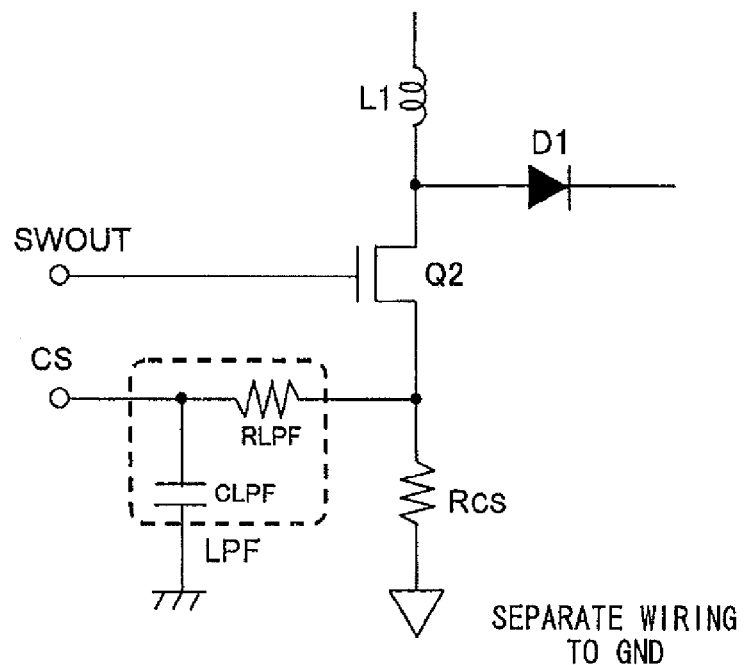
FIG. 16 is a diagram for describing a connection relationship among external elements related to operation of an OCP portion 111.

FIG. 16 is a diagram for describing a connection relationship among external elements related to operation of the OCP portion 111.

As shown in FIG. 16, a detection resistor RCS is inserted between the source of the power transistor Q2 (N-channel field effect transistor) for the voltage step-up DC/DC converter and the GND, and the connection node is connected with the CS terminal (22nd pin).

Besides, to reduce switching noise (spike noise), a low pass filter (a resistor RLPF and a capacitor CLPF) having a cut-off frequency of 1 to 2 [MHz] is inserted between the CS terminal and the detection resistor RCS. Here, if the time constant of the low pass filter LPF is too large, the rising of the CS terminal voltage becomes slow, and the detection operation of the OCP portion 111 becomes slow; accordingly, for example, it is appropriate that RLPF=100 [Q], CLPF=1000 [pF] when the oscillation frequency FOSC=300 [kHz].

Besides, a detection current IOCP in the OCP portion 111 is decided on by the following formula (5) based on the overcurrent protection operation voltage VDCS (a constant voltage applied to the non-inverting input terminal (+) of the comparator 112) and the detection resistor RCS.

$$IOCP[A]=VDCS(=0.4 [V])/RCS[\Omega] \quad (5)$$

Besides, because the OCP portion 111 is of the pulse-by-pulse type, the SWOUT terminal is fixed at the low level for one period decided on by the oscillation frequency FOSC of the voltage step-up DC/DC converter; thereafter, the voltage step-up operation is resumed. Besides, because a large-current line is formed between the detection resistor RCS and the GND, separate wiring to the GND should be performed in the board designing.

Next, the soft start portion 114 is described. In the semiconductor device 10 according to the present embodiment, the SS terminal (27th pin) is unused and opened. Besides, the open/short detection function of the open/short detection portion 118 is masked until the SS terminal voltage reaches a clamp voltage of 2.5 [V] (Typ.).

Next, detailed description of selection of external components is performed.

First, selection of the coil L1 is described in detail with reference to FIGS. 17A and 17B.

Figure 17A:
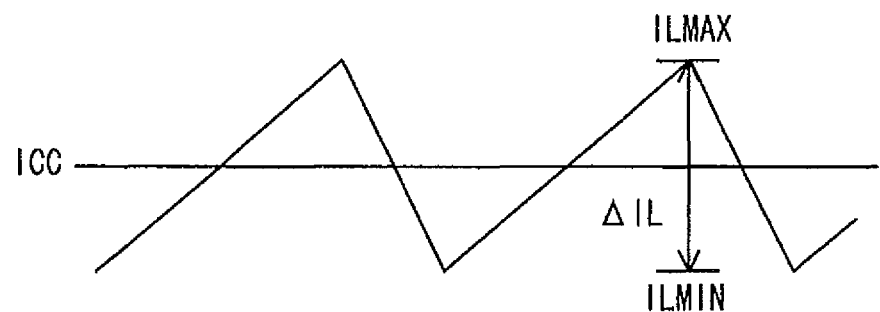
FIG. 17A is a waveform diagram for describing selection of a coil L1.
Figure 17B:
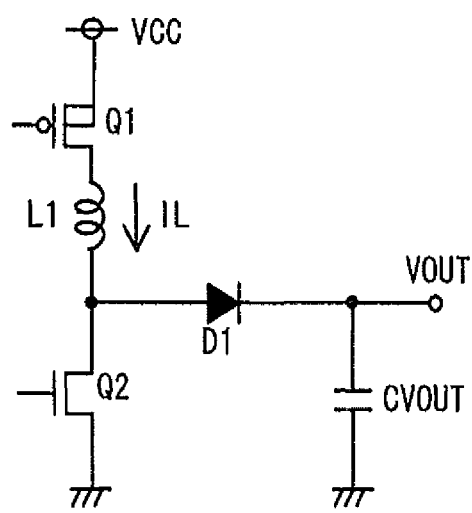
FIG. 17B is a circuit diagram for describing selection of the coil L1.

FIGS. 17A, 17B are each a diagram for describing selection of the coil L1. Here, in FIG. 17A, a ripple component ΔIL of the coil current IL is shown, and in FIG. 17B, a circuit that constitutes input and output stages of the DC/DC converter is shown.

The inductor value of the coil L1 extremely influences the ripple component ΔIL (a difference between the maximum value ILMAX and the minimum value ILMIN of the coil current IL) of the coil current IL. Specifically, as shown by the following formula (6), the larger the inductor value of the coil L1 is, and the higher the oscillation frequency FOSC is, the smaller the ripple component ΔIL becomes.

$$\Delta IL[A] = \frac{(VOUT - VCC) \times VCC}{L1 \times VOUT \times FOSC} \quad (6)$$

Besides, when the efficiency η is represented as shown by the following formula (7a), the maximum value ILMAX of the coil current IL becomes as shown by the formula (7b).

$$\eta = \frac{VOUT \times IOUT}{VCC \times ICC} \quad (7a)$$

$$ILMAX[A] = ICC + \frac{\Delta IL}{2} \quad (7b)$$
$$= \frac{VOUT \times IOUT}{VCC \times \eta} + \frac{\Delta IL}{2}$$

If the coil current IL exceeding the rated current value of the coil L1 is flown in the coil L1, the coil L1 reaches magnetic saturation and the efficiency η decreases. Accordingly, the coil L1 should be selected with a sufficient margin so as not to allow the maximum value ILMAX of the coil current IL to exceed the rated current value of the coil L1. Besides, to reduce loss in the coil L1 and improve the efficiency η, as the coil L1, a coil that has a small resistance component (a direct-current reactor DCR, an alternating-current ACR) should be selected.

Figure 18:
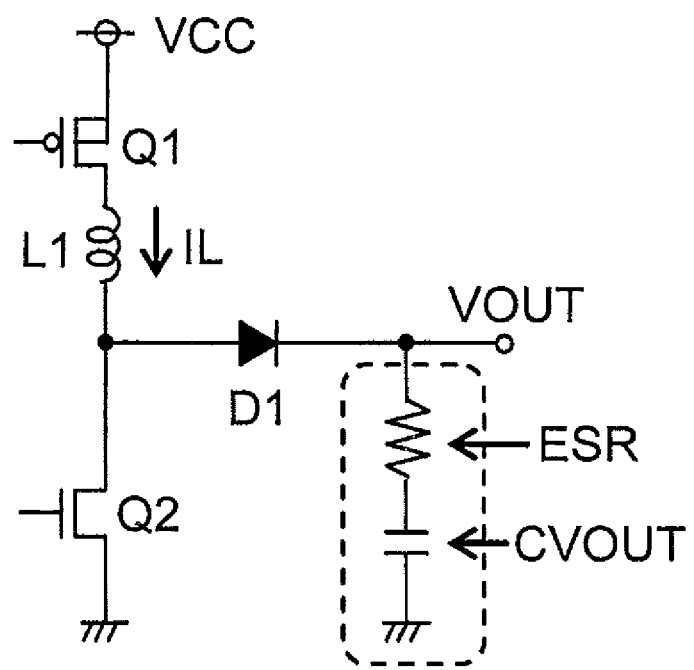
FIG. 18 is a diagram for describing selection of an output capacitor CVOUT.

Next, detailed description of selection of the output capacitor CVOUT is performed with reference to FIG. 18.

FIG. 18 is a diagram for describing selection of the output capacitor CVOUT, and a circuit that constitutes the input and output stages of the DC/DC converter is shown.

As for the selection of the output capacitor CVOUT, in light of a stable domain of the output voltage VOUT and further considering an equivalent series resistance ESR necessary to smooth a ripple component VOUT of the output voltage, it is sufficient to suitably decide on the output capacitor CVOUT.

The ripple component ΔVOUT of the output voltage VOUT is decided on as shown by the following formula (8).

$$\Delta VOUT[V] = ILMAX \times RESR + \frac{1}{CVOUT} \times \frac{IOUT}{\eta} \times \frac{1}{FOSC} \quad (8)$$

Here, in the above formula (8), ΔIL represents the ripple component of the output current IL; RESR represents the resistance value of the equivalent series resistance ESR of the output capacitor CVOUT; and η represents the efficiency.

Here, it is desirable to select the rating of the output capacitor CVOUT with a sufficient margin with respect to the output voltage VOUT.

Next, selection of the input capacitor CVCC is described in detail with reference to FIG. 19.

Figure 19:
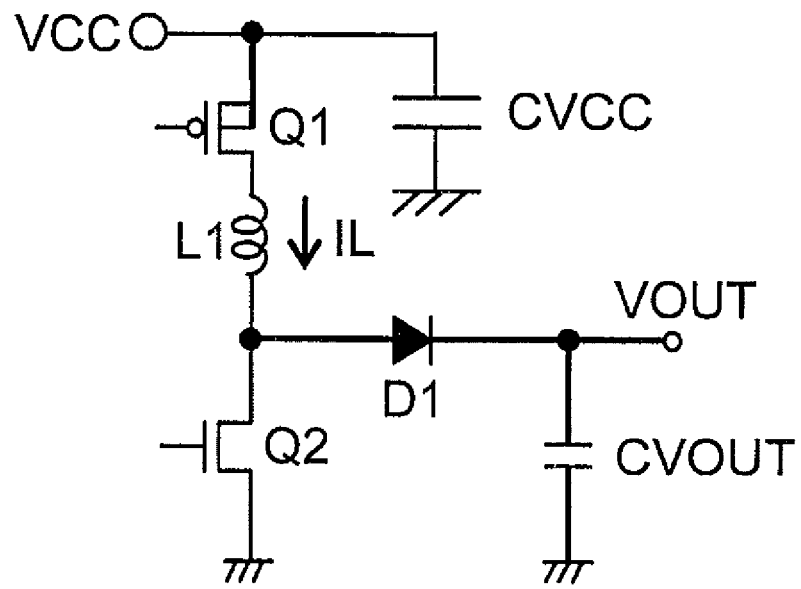
FIG. 19 is a diagram for describing selection of an input capacitor CVCC.

FIG. 19 is a diagram for describing selection of the input capacitor CVCC, and a circuit that constitutes the input and output stages of the DC/DC converter is shown.

As for the selection of the input capacitor CVCC, it is desirable to use an input capacitor having a low ESR that has a capacitance value capable of sufficiently interacting with a large ripple current IRMS so as to prevent a large transient voltage.

The above ripple current IRMS is given by the following formula (9).

$$IRMS[A] = IOUT \times \frac{\sqrt{(VOUT - VCC) \times VOUT}}{VOUT} \quad (9)$$

Besides, because the ripple current IRMS extremely depends on the characteristics of the power supply used for the input, the wiring pattern of the board and the gate-drain capacitances of the transistors Q1, Q2, it is desirable to sufficiently confirm the temperature, the load range, and the conditions of the transistors Q1, Q2 in a time of use.

Next, selection of the load-switch transistor Q1 and its soft start are described in detail with reference to FIGS. 20 and 21.

Figure 20:
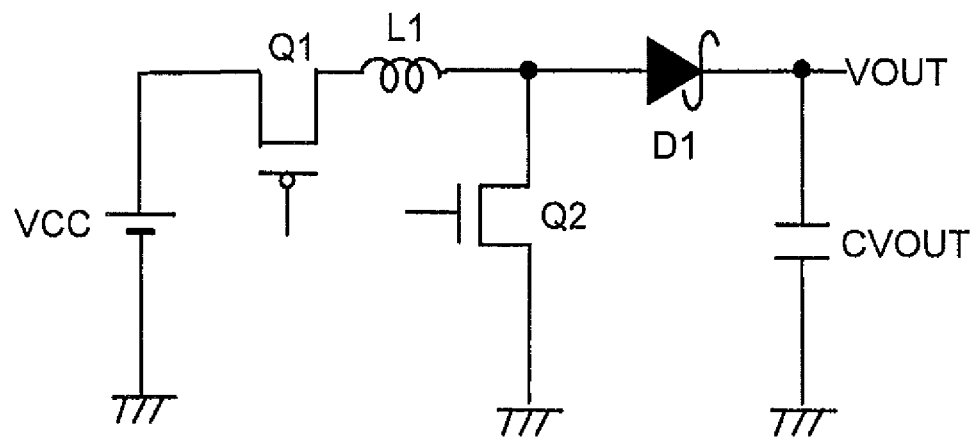
FIG. 20 is a diagram for describing selection of a load-switch transistor Q1 and its soft start.
Figure 21:
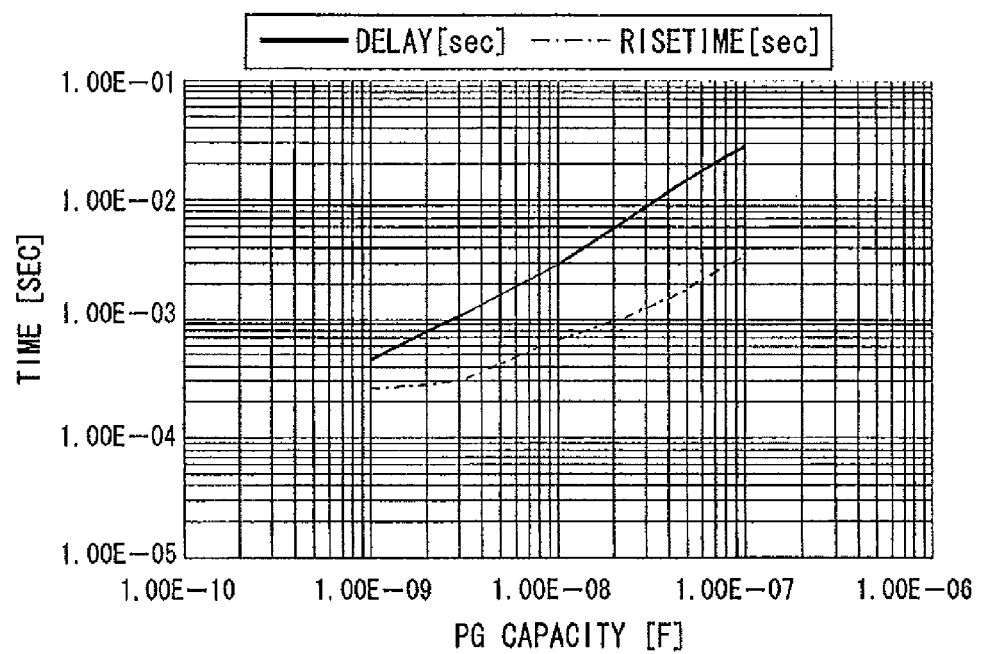
FIG. 21 is a graph showing a correlation between a gate-source capacity of the transistor Q1 and a soft start time.

FIG. 20 is a diagram for describing selection of the load-switch transistor Q1 and its soft start, and a circuit that constitutes the input and output stages of the DC/DC converter is shown. Besides, FIG. 21 is a graph showing a correlation between the gate-source capacitance of the transistor Q1 and the soft start time.

In a case of a usual voltage step-up application, there is no switch on the route that extends from the application terminal of the power-supply voltage VCC to the lead-out terminal of the output voltage VOUT; accordingly, if an output short-circuit occurs, an overcurrent flows in the route, so that the coil L1 and the rectifying diode D1 can be broken. To avoid this, in the semiconductor device 10 according to the present embodiment, the P-channel type field effect transistor Q1 for the load-switch is inserted between the application terminal of the power-supply voltage VCC and the coil L1. Here, as the transistor Q1, it is sufficient to select a transistor whose gate-source breakdown voltage and whose drain-source breakdown voltage are both higher than the power-supply voltage VCC.

Besides, to perform the soft start of the load switch, it is sufficient to insert capacitance between the gate and source of the transistor Q1. According to this, as shown in FIG. 21, it is possible arbitrarily to decide on the soft start time depending on the inserted capacitance value. However, the soft start time changes depending on the gate capacitance of the transistor Q1 as well.

Next, selection of the switching transistor Q2 is described. There is no problem whatever MOSFET is used if the MOSFET has the absolute maximum rated current that is larger than the rated current of the coil L1 and the absolute maximum rated voltage that is higher than the breakdown voltage of the output capacitor CVOUT+the forward-direction drop voltage VF of the rectifying diode D1; however, to achieve high-speed switching, a MOSFET that has a small gate capacitance (the amount of injected electric charges) should be selected, and it is desirable to use a MOSFET that has gate capacitance lager than the overcurrent protection set value. Besides, if a MOSFET that has a small on resistance is selected, it becomes possible to obtain high efficiency.

Next, selection of the rectifying diode D1 is described. Whatever diode may be used if the diode is a Schottky barrier diode that has an electric-current capability equal to or larger than the rated current of the coil L1 and a backward breakdown voltage equal to or higher than the breakdown voltage of the output capacitor CVOUT; especially, it is sufficient select a diode whose forward-direction drop voltage VF is low.

Next, detailed description of a phase-compensation setting method is performed.

First, stable conditions of an application are described. As for conditions under which a feedback system with negative feedback returned becomes stable, it is necessary that the phase delay is 150° or smaller (i.e., the phase margin is 30° or larger) at a time the gain is 1 (0 [dB]).

Besides, because the DC/DC converter application is sampled by the oscillation frequency FOSC, it is necessary to set the GBW (Gain-Band Width) (a product of the gain and the band width) of the entire system at a value that is 1/10 the oscillation frequency FOSC or lower.

Summing up the above description, the characteristics the application aims at are the phase delay that is 150° or smaller (i.e., the phase margin is 30° or larger) at the time the gain is 1 (0 [dB]); and it is sufficient if the GBW (i.e., the frequency at the gain of 0 [dB]) at that time is 1/10 the oscillation frequency FOSC or lower. Accordingly, to improve the response according to a limit to the GBW, it is necessary to raise the oscillation frequency FOSC.

To secure the stability by phase compensation, it is sufficient to cancel a secondary phase delay (−180°) due to an LC resonance by a secondary phase advance (i.e., two phase advances are used). Here, as a means for giving a phase advance, the ESR component (see FIG. 23) of the output capacitor CVOUT and the CR component (see FIG. 24) connected with the COMP terminal (28th pin) are possible.

Figure 22:
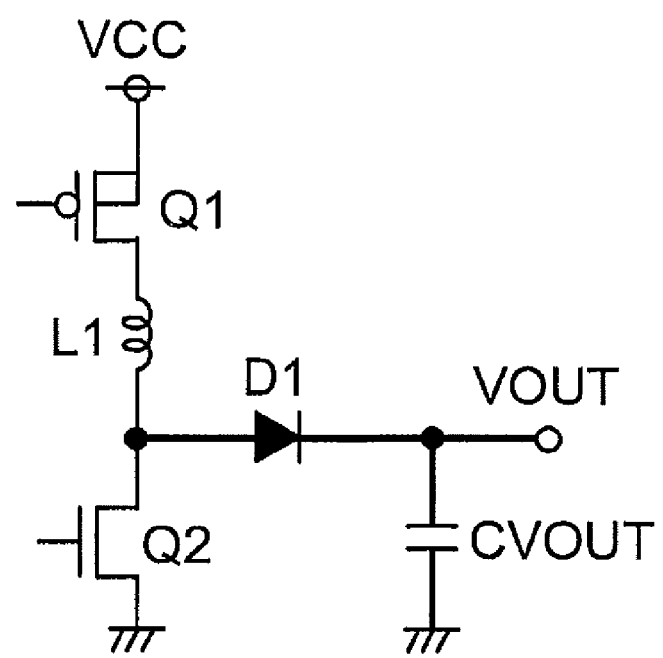
FIG. 22 is a circuit diagram showing an LC resonance circuit of a DC/DC converter.
Figure 23:
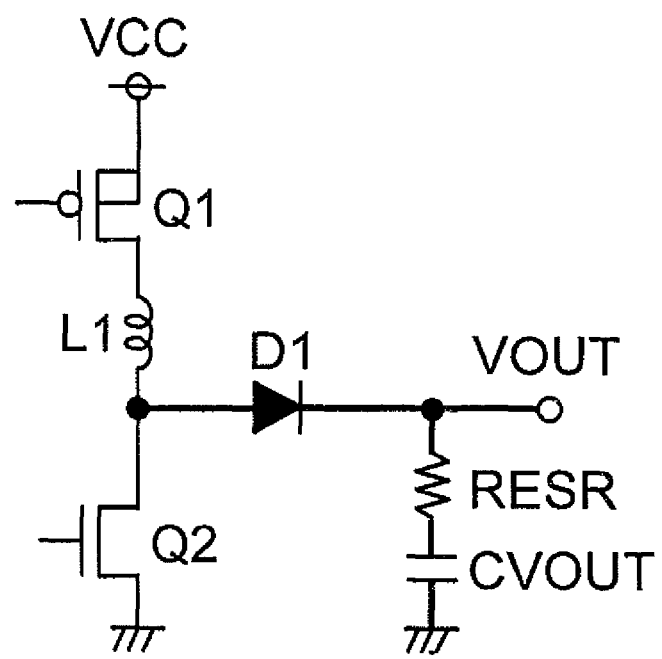
FIG. 23 is a circuit diagram showing a first example (an ESR component of an output capacitor) of a phase advance means.
Figure 24:
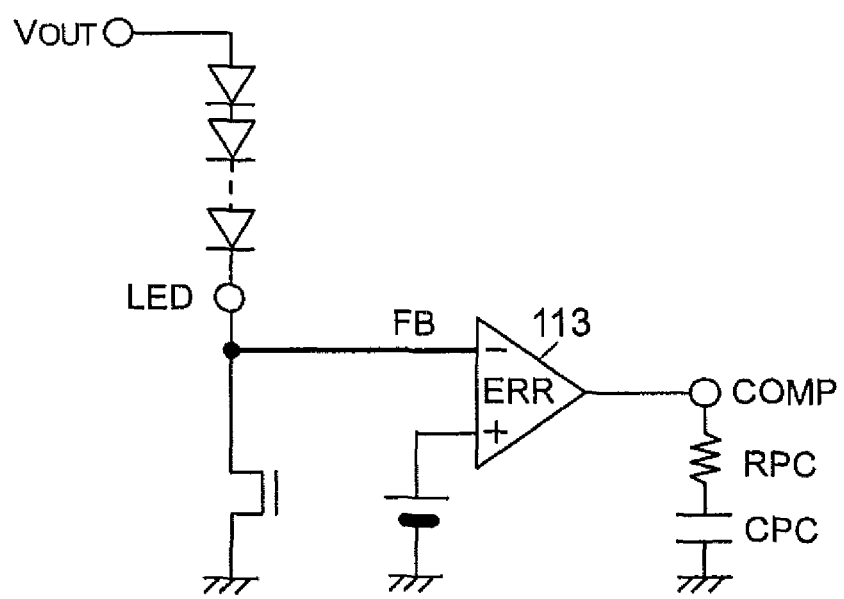
FIG. 24 is a circuit diagram showing a second example (a CR component connected with a COMP terminal) of a phase advance means.

In the DC/DC converter application, as shown in FIG. 22, there is invariably an LC resonance circuit. Accordingly, the phase delay at that portion becomes −180°. As shown in FIG. 23, in a case where the output capacitor CVOUT is an element such as an aluminum electrolytic capacitor or the like that has a large ESR (a few ohms [Ω]), a phase advance of +90° occurs and the phase delay becomes −90°. On the other hand, in a case where the output capacitor CVOUT such as a ceramic capacitor or the like that has a low ESR is used, it is necessary to insert resistance equal to the ESR component.

Here, because of a change in the phase characteristic due to the ESR, the phase advance to be inserted becomes one. Besides, as for setting of the frequency into which a phase advance is inserted, for the purpose of canceling the LC resonance, it is ideally desirable to set the frequency near the LC resonance frequency.

Next, an operation sequence of the semiconductor device 10 is described with reference to FIG. 25.

Figure 25:
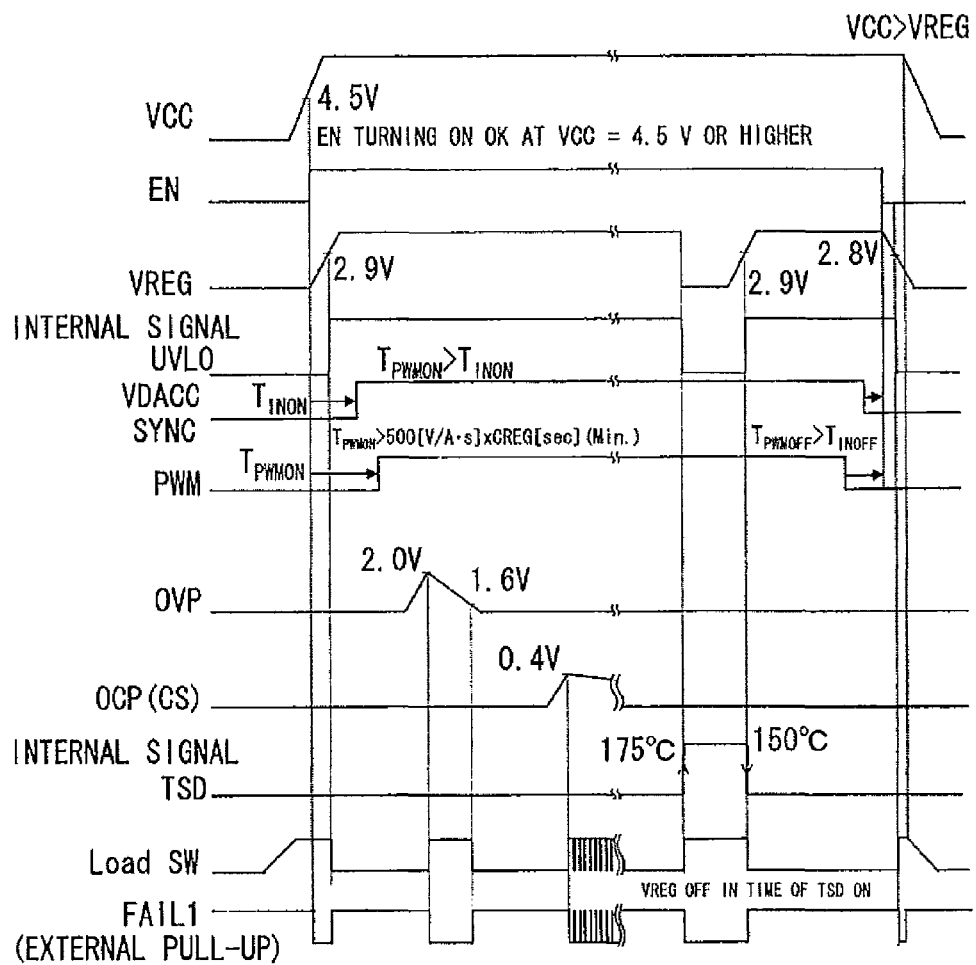
FIG. 25 is a timing chart showing an operation sequence of the semiconductor device 10.

FIG. 25 is a timing chart showing an operation sequence of the semiconductor device 10.

When the enable signal EN rises to high level after the power-supply voltage VCC is turned on, generation of the reference voltage VREG is started in the VREG portion 101. Here, as for the enable signal EN, after the power-supply voltage VCC sufficiently rises, for example, after the power-supply voltage VCC becomes 4.5 [V] or higher, it is sufficient to turn on the enable signal EN.

When the reference voltage VREG reaches 2.9 [V], it is recognized by the UVLO portion 103 that it is not a reduced-voltage state, and the UVLO signal rises to the high level. According to this, the internal circuit of the semiconductor device 10 starts to operate. Here, during a time the UVLO signal is maintained in the low level, the switch 102 is maintained in the off state and the terminal voltage of the LOADSW terminal (2nd pin) is maintained in the high level. Accordingly, because the load-switch transistor Q1 is turned off, the voltage step-up operation of the DC/DC converter is maintained in a stop state. On the other hand, when the UVLO signal rises to the high level, the switch 102 is turned on, and the terminal voltage of the LOADSW terminal falls to the low level. As a result of this, the load-switch transistor Q1 is turned on, and the voltage step-up operation becomes possible.

For stable operation, there are predetermined input sequences for the VDAC signal, SYNC signal and PWM signal that are external signals. Specifically, it is desirable to input the VDAC signal and SYNC signal after a first predetermined time TINON elapses from the input timing of the enable signal EN; and it is desirable to input the PWM signal after a second predetermined time TPWMON elapses from the input timing of the EN signal. Here, the second predetermined time TPWMON>the first preternined time TINON and the second predetermined time TPWMON>500 [WA·s]× CREG [sec]. Besides, it is desirable to block the inputs of the VDAC signal and SYNC signal earlier than the EN signal by a third predetermined time TINOFF, while it is desirable to block the input of the PWM signal earlier than the EN signal by a fourth predetermined time TPWMOFF. Here, the fourth predetermined time TPWMOFF>the third predetermined time TINOFF. Besides, although not shown in this figure, it is desirable fix the logics of the LEDEN1 signal and LEDEN2 signal before the EN signal shifts to the high level.

In the OVP portion 105, when the terminal voltage of the OVP terminal (25th pin) reaches 2 [V], it is recognized as an overvoltage state, and the voltage step-up operation is stopped. Thereafter, in the OVP portion 105, when the terminal voltage of the OVP terminal drops to 1.6 [V], it is recognized that the overvoltage state is released, and the voltage step-up operation is resumed.

In the OCP portion 111, when the terminal voltage of the CS terminal (22nd pin) reaches 0.4 [V], it is recognized as an overcurrent state, and thereafter, the voltage step-up operation of the DC/DC converter is intermittently turned on/off by the pulse-by-pulse fashion.

In the TSD portion 104, when the temperature of the semiconductor device 10 reaches 175[° C.], it is recognized as an abnormal heating state, and the voltage step-up operation of the DC/DC converter is stopped. Thereafter, in the TSD portion 104, when the temperature of the semiconductor device 10 drops to 150[° C.], it is recognized that the abnormal heating state is released, and the voltage step-up operation is resumed.

Here, if the EN signal is made fall to the low level, the generation of the reference voltage VREG is stopped. In the UVLO portion 103, when this reference voltage VREG drops to 2.8 [V], it is recognized as a reduced-voltage state, and the UVLO signal falls to the low level. In this way, the internal circuit of the semiconductor device 10 stops the operation.

Next, detailed description of a second embodiment of the semiconductor device according to the present invention is performed.

Figure 26:
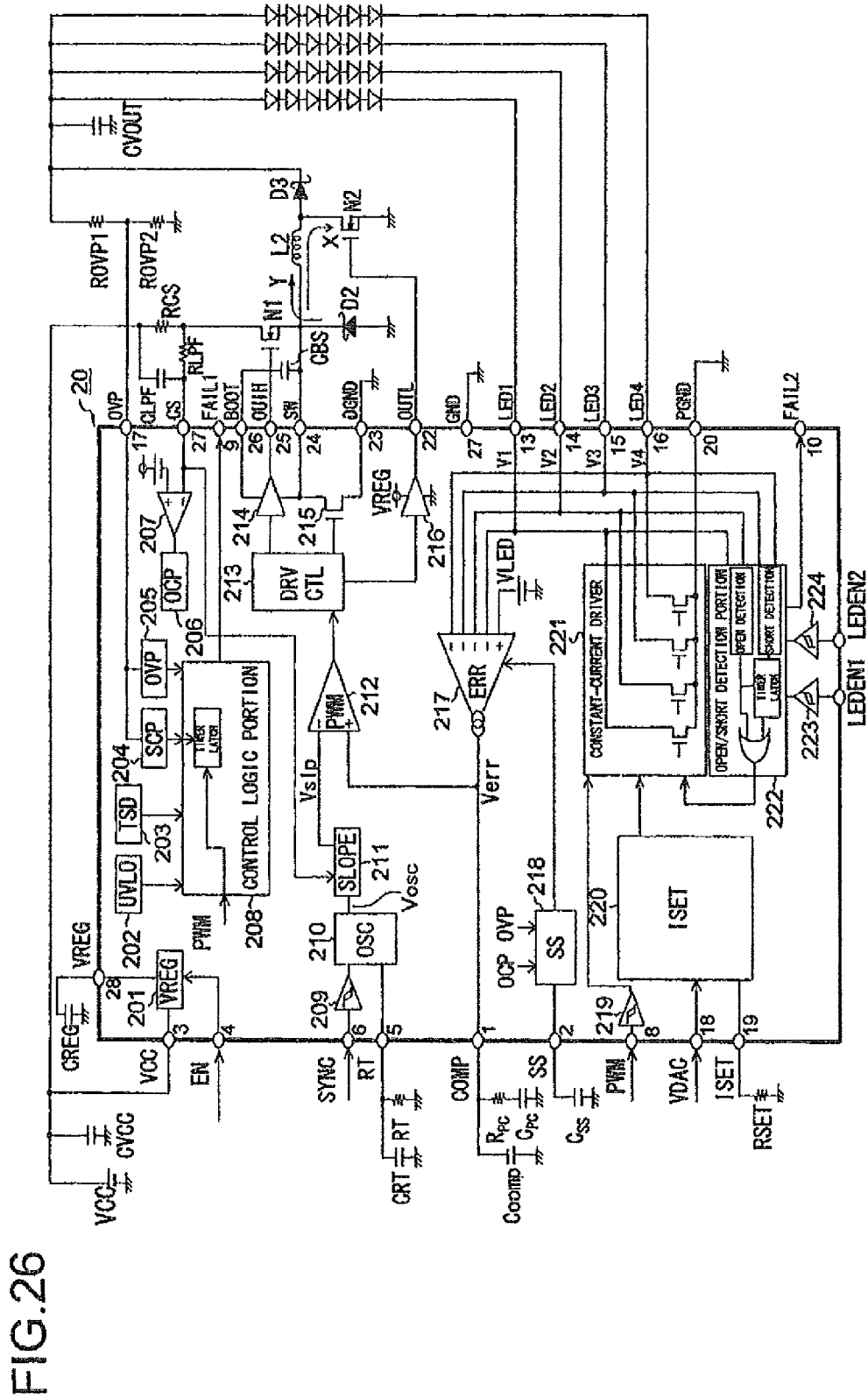
FIG. 26 is a block diagram showing a second embodiment of a semiconductor device according to the present invention.

FIG. 26 is a block diagram showing a second embodiment of the semiconductor device according to the present invention.

First, an overview of a semiconductor device 20 according to the present embodiment is described.

The semiconductor device 20 is a 36 V-resistant white-LED driver IC; and a voltage step-up and -down DC/DC converter of a current mode and a four-channel output constant-current driver are integrated into one chip. The semiconductor device 20 is able to perform light control of the white LED by using any of PWM [Pulse Width Modulation] control and VDAC control.

Next, of features of the semiconductor device 20 according to the present embodiment, especially, points different from the first embodiment is described.

A first feature is that to interact with the power-supply voltage VCC directly supplied from a battery, a voltage step-up/-down DC/DC controller block is incorporated instead of the voltage step-up DC/DC controller block. A second feature is that to use a low-ESR ceramic capacitor as the output capacitor CVOUT, the control mode of the DC/DC converter is changed from a voltage mode to an electric-current mode. A third feature is that to raise the PWM light control capability of LED luminous brightness, a duty ratio (with no over-shoot) of 0.38[%] is achieved. A fourth feature is that a relative uneven width+3% of the output current ILED and an absolute uneven width+5% of the output current TIED are achieved. A fifth feature is that a protection function portion (SCP [Short Circuit Protection]) which detects a short in the anode and cathode of the LED and performs an appropriate protection operation is incorporated.

Here, the semiconductor device 20 according to the present embodiment is used for drive control of a backlight of a car navigation monitor, backlights of medium- and small-sized LED panels and the like.

The semiconductor device 20 according to the present embodiment having the above features, as shown in FIG. 26, is composed of an integration of: a reference voltage generation portion 201 (hereinafter, called a VREG portion 201); a reduced-voltage protection portion 202 (hereinafter, called a UVLO portion 202); a temperature protection portion 203 (hereinafter, called a TSD portion 203); a short protection portion 204 (hereinafter, called a SCP portion 204); an overvoltage protection portion 205 (hereinafter, called an OVP portion 205); an overcurrent protection portion 206 (hereinafter, called an OCP portion 206); a comparator 207; a control logic portion 208; an input buffer 209; an oscillator portion 210; a slope-voltage generation portion 211; a PWM comparator 212; a driver control portion 213; a driver 214; an N-channel type field effect transistor 215; a driver 216; an error amplifier 217; a soft start portion 218; an input buffer 219; a current set portion 220; a constant-current driver 221; an open/short detection portion 222; and input buffers 223 and 224.

Here, it is possible to roughly divide the above circuit portion of the semiconductor device 20 into four blocks of: a VREG block (the VREG portion 201); a voltage step-up and -down DC/DC controller block (the OCP portion 206, comparator 207, control logic portion 208, input buffer 209, oscillator portion 210, slope-voltage generation portion 211, PWM comparator 212, driver control portion 213, driver 214, transistor 215, driver 216, error amplifier 217 and soft start portion 218); a current driver block (the input buffer 219, current set portion 220, constant-current driver 221, open/short detection portion 222 and input buffers 223 and 224); and a protection block (the UVLO portion 202, TSD portion 203, SCP portion 204 and OVP portion 205).

Besides, the semiconductor device 20 according to the present embodiment includes 28 external terminals (1st to 28th pins) as means for securing electric connections with outside.

Figure 27:
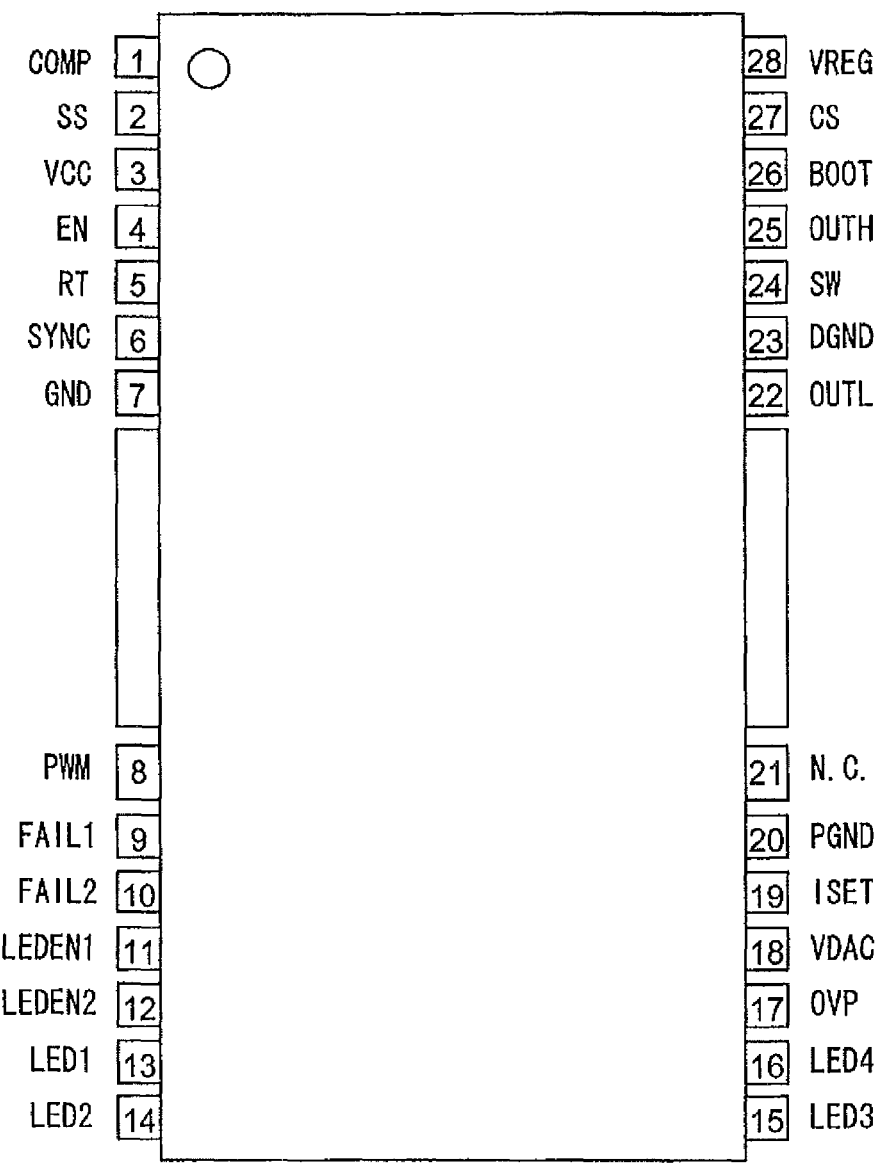
FIG. 27 is a pin arrangement diagram of a semiconductor device 20.

FIG. 27 is a pin arrangement diagram of the semiconductor device 20 and FIG. 28 is a table which shows pin numbers, terminal names and functions of the external terminals. In FIG. 27, wide terminals disposed at both sides of central portions of the semiconductor device 20 are FIN terminals that are linked to subground and improve heat radiation.

FIG. 29 is a table showing electric characteristics of the semiconductor device 20 that has the above structure. Here, the electric characteristics shown in FIG. 29 represent numerical values at the power-supply voltage VCC=12 [V], ambient temperature Ta=25[° C.] unless otherwise specified.

Next, detailed description of operation of each portion of the semiconductor device 20 is performed centering on points different from the first embodiment.

First, detailed description of the current driver block of the semiconductor device 20 (the input buffer 219, current set portion 220, constant-current driver 221, open/short detection portion 222 and input buffers 223 and 224) is performed.

Figure 30:
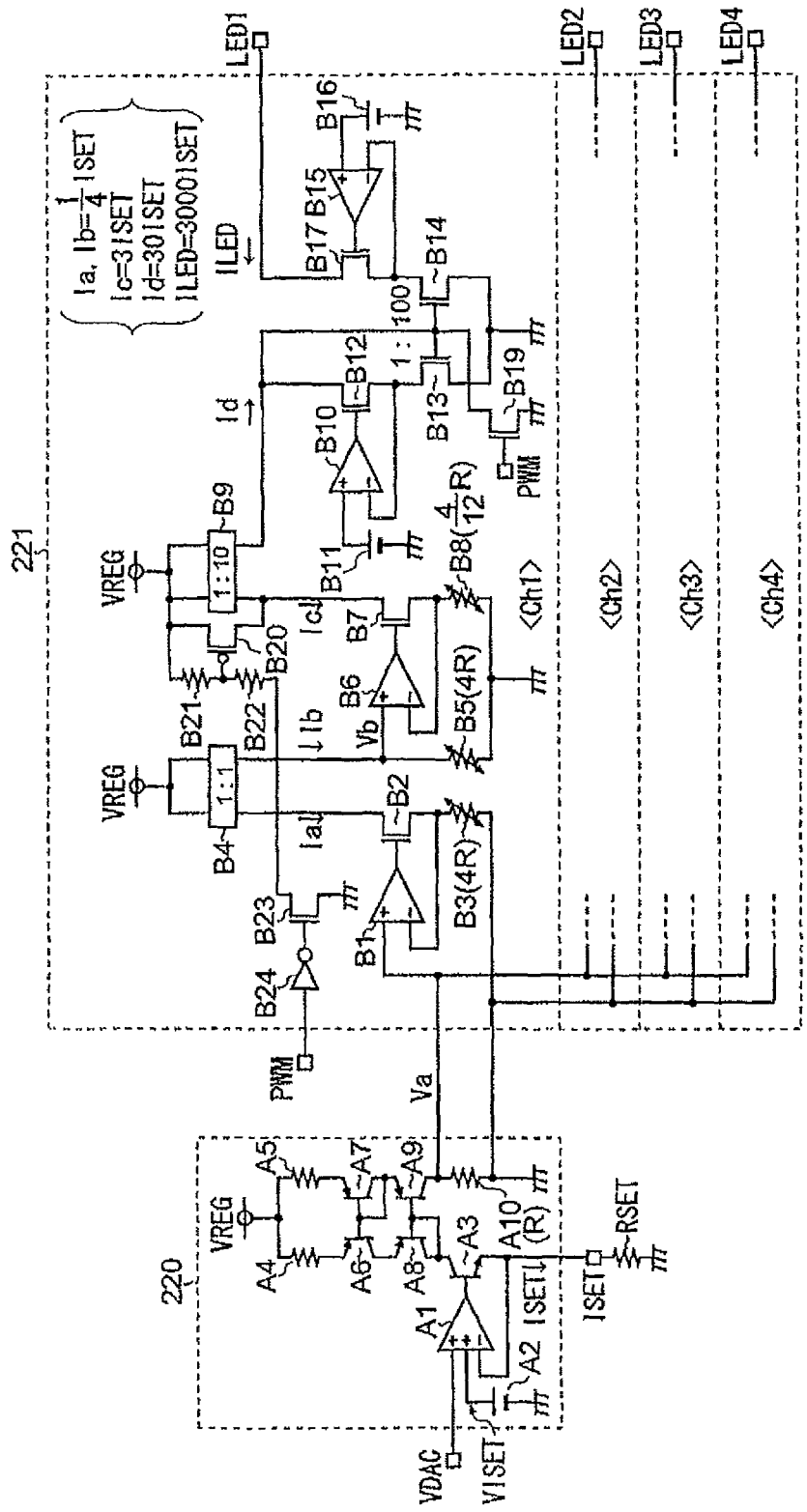
FIG. 30 is a circuit diagram showing structural examples of a current set portion 220 and a constant-current driver 221.

FIG. 30 is a circuit diagram showing structural examples of the current set portion 220 and the constant-current driver 221.

As shown in FIG. 30, the current set portion 220 includes: the operational amplifier A1; the direct-current voltage source A2; the npn-type bipolar transistor A3; the resistors A4, A5; the pnp-type bipolar transistors A6 to A9; and the resistor A10 (the resistance value R).

The first non-inverting input terminal (+) of the operational amplifier A1 is connected with the VDAC terminal (8th pin). The second non-inverting input terminal (+) of the operational amplifier A2 is connected with the positive-polar terminal of the direct-current voltage source A2, and the predetermined constant voltage VISET (=2.0 [V]) is applied. The negative-polar terminal of the direct-current voltage source A2 is connected with the ground terminal. The inverting input terminal (−) of the operational amplifier A2 is connected with the ISET terminal (9th pin). The base of the transistor A3 is connected with the output terminal of the operational amplifier A1. The emitter of the transistor A3 is connected with the ISET terminal.

One terminal of each of the resistors A4, A5 is connected with the application terminal of the reference voltage VREG. The other terminal of the resistor A4 is connected with the emitter of the transistor A6. The other terminal of the resistor A5 is connected with the emitter of the transistor A7. The bases of the transistors A6, A7 are connected with each other and the connection node is connected with the collector of the transistor A7. The collector of the transistor A6 is connected with the emitter of the transistor A8. The collector of the transistor A7 is connected with the emitter of the transistor A9. The bases of the transistors A8, A9 are connected with each other and the connection node is connected with the collector of the transistor A8. The collector of the transistor A8 is connected with the collector of the transistor A3. The collector of the transistor A9 is connected with the ground terminal via the resistor A10.

On the other hand, as shown in FIG. 30, the constant-current driver 221 includes 4 channels of output stages Ch1, Ch2, Ch3 and Ch4 that supply the output current ILED to the LED1 terminal to LED4 terminal, respectively. Here, the output stage Ch1 includes: the operational amplifier B1; the N-channel type field effect transistor B2; the resistor B3 (the resistance value 4R); the current mirror circuit B4 (the mirror ratio 1:1); the resistor B5 (the resistance value 4R); the operational amplifier B6; the N-channel type field effect transistor B7; the resistor B8 (the resistance value ($4/12$)×R); the current mirror circuit B9 (the mirror ratio 1:10); the operational amplifier B10; the direct-current voltage source B11; the N-channel type field effect transistors B12 to B14; the operational amplifier B15; the direct-current voltage source B16; the N-channel type field effect transistor B17; an N-channel type field effect transistor B19; a P-channel type field effect transistor B20; resistors B21, B22; an N-channel type field effect transistor B23; and an inverter B24.

The non-inverting input terminal (+) of the operational amplifier B1 is connected the connection node of the transistor A9 and the resistor A10. The inverting input terminal (−) of the operational amplifier B1 is connected with one terminal of the resistor B3. The other terminal of the resistor B3 is connected with the ground terminal. The drain of the transistor B2 is connected with the input terminal of the current mirror circuit B4. The source of the transistor B2 is connected with one terminal of the resistor B3. The gate of the transistor B2 is connected with the output terminal of the operational amplifier B1. The power-supply input terminal of the current mirror circuit B4 is connected with the application terminal of the reference voltage VREG.

The non-inverting input terminal (+) of the operational amplifier B6 is connected with the output terminal of the current mirror circuit B4 and with one terminal of the resistor B5. The inverting input terminal of the operational amplifier B6 is connected with one terminal of the resistor B8. Both of the other terminals of the resistors B5, B8 are connected with the ground terminal. The drain of the transistor B7 is connected with the input terminal of the current mirror circuit B9. The source of the transistor B7 is connected with one terminal of the resistor B8. The gate of the transistor B7 is connected with the output terminal of the operational amplifier B6. The power-supply input terminal of the current mirror circuit B9 is connected with the application terminal of the reference voltage VREG.

The non-inverting input terminal (+) of the operational amplifier B10 is connected with the positive-polar terminal of the direct-current voltage source B11. The negative-polar terminal of the direct-current voltage source B11 is connected with the ground terminal. The drain of the transistor B12 is connected with the output terminal of the current mirror circuit B9. The source of the transistor B12 is connected with the inverting input terminal (−) of the operational amplifier B10. The gate of the transistor B12 is connected with the output terminal of the operational amplifier B10.

The drain of the transistor B13 is connected with the source of the transistor B12. The gates of the transistors B13, B14 are connected with each other and the connection node is connected with the drain of the transistor B12 and also connected with the drain of the transistor B19. All the sources of the transistors B13, B14 and B19 are connected with the ground terminal. The gate of the transistor B19 is connected with the PWM terminal (8th pin) via the input buffer 219 (not shown in this figure).

The non-inverting input terminal (+) of the operational amplifier B15 is connected with the positive-polar terminal of the direct-current voltage source B16. The negative-polar terminal of the direct-current voltage source B16 is connected with the ground terminal. The drain of the transistor B17 is connected with the LED1 terminal. The source of the transistor B12 is connected with the inverting input terminal (−) of the operational amplifier B15 and also connected with the drain of the transistor B14. The gate of the transistor B17 is connected with the output terminal of the operational amplifier B15.

A source of the transistor B20 is connected with the application terminal of the reference voltage VREG. A drain of the transistor B20 is connected with the input terminal of the current mirror circuit B9. One terminal of the resistor B21 is connected with the application terminal of the reference voltage VREG. The other terminal of the resistor B21 is connected with a gate of the transistor B20. One terminal of the resistor B22 is connected with the gate of the transistor B20. The other terminal of the resistor B22 is connected with a drain of the transistor B23. A source of the transistor B23 is connected with the ground terminal. A gate of the transistor B23 is connected with an output terminal of the inverter B24. An input terminal of the inverter B24 is connected with the PWM terminal via the input buffer 219 (not shown in this figure).

Here, because the other output stages Ch2 to Ch4 that constitute the constant-current driver 221 include the same structure as that of the above output stage Ch1, detailed description of them is skipped.

In the current set portion 220 and the constant-current driver 221 that have the above structures, the output current ILED is set based on the following formula (10).

$$\text{ILED[mA]} = \min\{\text{VDAC}, 2.0\,[\text{V}]\}/\text{RSET}\,[k\Omega] \times 3000 \quad (10)$$

In the above formula (10), the parameter min {VDAC, 2.0 [V]} is a voltage value that is the lower of the control voltage VDAC input into the VDAC terminal (18th pin) and the constant voltage VISET (=2.0 [V]) predetermined in the current set portion 220. Besides, the parameter RSET is a resistance value of the resistor RSET that is externally connected with the ISET terminal (19th pin); and a parameter 3000 (Typ.) is a constant that is decided on in the constant-current driver 221.

Specifically, the resistor RSET is pulldown-connected with the ISET terminal (19th pin), so that an electric current predetermined-gain times (e.g., 3000 times) higher than the reference current ISET flowing in this is set as the maximum value (e.g., 50 [mA]) of the output current ILED.

Describing specifically with reference to the example in FIG. 30, in the constant-current driver 221, first, by using the operational amplifier B1, transistor B2 and resistor B3 (the resistance value 4R), the terminal voltage Va (=ISET×R) of the resistor A10 is voltage/current-converted to generate the intermediate current Ia (=¼ISET) that is ¼ the reference current ISET. Next, by using the current mirror circuit B4, the intermediate current Ia is mirrored at 1:1 to generate the intermediate current Ib (=¼ISET). Next, by using the resistor B5 (the resistance value 4R), the intermediate Ib is current/voltage-converted to generate the terminal voltage Vb (=ISET×R). Next, by using the operational amplifier B6, transistor B7 and resistor B8 (the resistance value (4/12)×R)), the terminal voltage Vb of the resistor B5 is voltage/current-converted to generate the intermediate current Ic (=3ISET) that is times as large as the reference current ISET. Next, by using the current mirror circuit B9, the intermediate current Ic is mirrored at 1:10 to generate the intermediate current Id (=30ISET) that is 30 times as large as the reference current ISET. And, finally, by using the current mirror circuit that includes the transistors B13, B14, the intermediate current Id is mirrored at 1:100 to generate the output current ILED (=3000ISET) that is 3000 times as large as the reference current ISET.

Here, to raise the accuracy of the output current ILED, in the last-stage current mirror circuit, by using the operational amplifiers B10, B15, the drain-source voltages of the transistors B13, B14 are made identical to each other (e.g., 0.3 [V]). Besides, the constant-current driver 221 is so structured as to generate the desired output current ILED by repeating the voltage/current conversion and the current/voltage conversion based on the input reference current ISET. Accordingly, resistor elements (the resistors B3, B5 and B8 in the example in FIG. 30) used for the above conversion processes increase and the trimming chances increase. As described above, according to the structure including many resistors that are able to be trimmed, by finely adjusting the resistance values, it becomes possible to reduce the relative uneven width and the absolute uneven width of the output current ILED.

Unlike the first embodiment that amplitudes the reference current ISET without stopping by the last-stage current mirror circuit (ISET→⅕ISET→2ISET→3300ISET), the semiconductor device 20 according to the second embodiment is so structured as to dispersedly perform current amplification in the generation process of the output current FLED in the constant-current driver 221 (ISET→¼ISET→3ISET→30ISET→3000ISET).

Figure 31A:
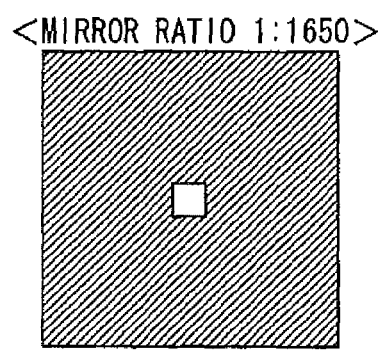
FIG. 31A is a schematic diagram (in a case of a mirror ratio 1:1650) showing a correlation between a mirror ratio and a transistor size.
Figure 31B:
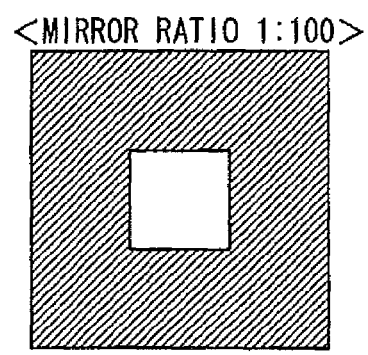
FIG. 31B is a schematic diagram (in a case of a mirror ratio 1:100) showing a correlation between a mirror ratio and a transistor size.

According to such structure, as shown by a comparison of FIG. 31A and FIG. 31B, it is possible to reduce the unevenness in the production of elements and the influence of stress by decreasing a difference between the transistor sizes of the transistors B13, B14 that constitute the last-stage current mirror circuit. Specifically, if the difference between the transistor sizes is large, a state in which a large stress acts on only one transistor while almost no stress acts on the other transistor occurs, that is, the transistors are likely to be subjected to the influence of stress that is generated during a packaging time of the semiconductor device 20; however, according to the structure in the present embodiment, because the difference between the transistor sizes becomes small, an equal stress is likely to act on both elements, so that it becomes possible to reduce the influence of stress. Of course, in designing the transistor elements, it is desirable to suitably design W/L of each element to allow the transistors to operate in a saturation domain in an actual use range (5 [mA] or more is expected) of the output current ILED.

Figure 32:
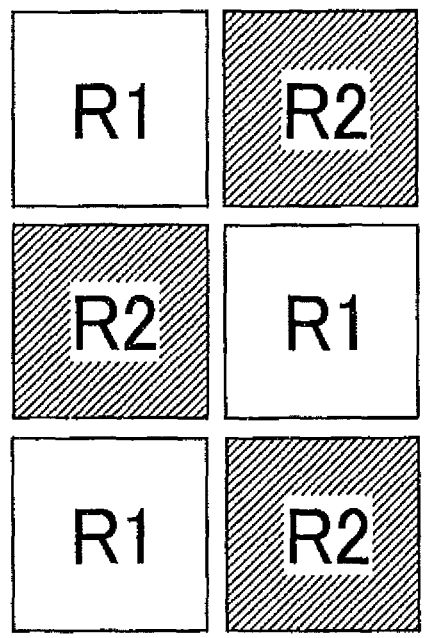
FIG. 32 is a layout diagram of zigzag-arranged resistors.

Besides, in the semiconductor device 20 according to the present embodiment, as shown in FIG. 32, pairs of resistors R1, R2 (e.g., the resistors B3 and B5 or the resistors B5 and B8) are arranged in a zigzag layout. According to the employment of such arrangement layout, in packaging the semiconductor device 20, an equal stress is likely to act on the pair of resistors R1, R2, so that it becomes possible to reduce the influence of stress.

As described above, in the semiconductor device 20 according to the present embodiment, the accuracy of the output current ILED is improved from many sides, that is, the increase in the resistor trimming chance, dispersion of the current amplification capability, improvement in the pairing easiness of resistors and the like. According to such structure, it is possible to achieve the relative uneven width of ±3% and the absolute uneven width of ±5% of the output current ILED after the packaging and it becomes possible to contribute to reduction in the brightness unevenness and longevity of the LED.

Here, as for the resistance value of the resistor RSET, as described with reference to the above FIG. 11, it is desirable to use a resistor that has a resistance of 300 [kΩ] or lower.

Here, in a case where the variable control (light control of the LED) of the output current ILED is performed by using the above control voltage VDAC, it is sufficient to set the input range at a range of 0.1 to 2.0 [V]. By applying such control voltage VDAC, it becomes possible to decrease the output current ILED from the maximum value.

On the other hand, in a case where 2.0 [V] or higher is input as the control voltage VDAC, as given by the above formula (10), the voltage value of the constant voltage VISET is selected; accordingly, a non-use state in which the light control function by the control voltage VDAC is not used occurs. In a case where the light control by the control voltage VDAC is not used, from the viewpoint of avoidance of malfunction, it is sufficient not to open the VDAC terminal but connect it with the application terminal of the reference voltage VREG (5 [V]).

In addition, in the semiconductor device 20 according the present embodiment, besides the light control of the LED that uses the above control voltage VDAC, by using the PWM signal input into the PWM terminal (8th pin), the on/off (in the example in FIG. 30, the on/off of the transistors B13, B14 that constitute the last-stage current mirror circuit and the on/off of the current mirror circuit B9) of the constant-current driver 221 is controlled, so that it is possible to perform the light control of the LED as well.

Specifically, in the semiconductor device 20 according to the present embodiment, the on/off of the transistors B13, B14 that constitute the last-stage current mirror circuit and the on/off of the current mirror circuit B9 are controlled based on the PWM signal, so that the duty ratio of the PWM signal becomes the duty ratio of the output current ILED; accordingly, it becomes possible to seemingly decrease the output current ILED from the maximum value (or a current value decided on by the control voltage VDAC).

Here, in the first embodiment that converts the reference current ISET into a pulse current based on the PWM signal, ringing occurs in the current mirror circuits B4, B9, which leads to an overshoot of the output current IT however, in the structure according to the present embodiment, such problem does not occur.

Besides, in the semiconductor 20 according to the present embodiment, as a further measure against an overshoot, an operational amplifier that has a slow slew rate (e.g., 0.5 [V/µs]) is used as the output-stage operational amplifier B15; and fluctuation in the gate-source voltage VGS of the transistor B17 is limited, so that the rising of the output current ILED is slowed down to prevent an overshoot from occurring.

Further, in the semiconductor device 20 according to the present embodiment, as described above, because the intermediate current Id that flows into the last-stage current mirror circuit is increased from 2ISET in the first embodiment to 30ISET, the response of the transistors B13, B14 rises, which allows removal of the pull-down resistor B18; accordingly, it becomes possible to further curb occurrence of an overshoot.

As described above, in the semiconductor device 20 according to the present embodiment, from many sides such as the PWM control of the last-stage current mirror circuit, use of the operational amplifier B15 having a slow slew rate, removal of the pull-down resistor B18 and the like, the improvement in response of the output current ILED and the reduction in overshoot are performed. According to such structure, without causing an overshoot, it becomes possible to achieve improvement (the minimum duty ratio: 0.38% (at 150 [Hz])) in the PWM light control capability and improve the light control accuracy at a low duty.

On the other hand, in a case where the light control function by the PWM signal is not used, it is sufficient to fix the PWM terminal at the high level (e.g., the constant voltage VREG). Here, it is desirable to inset a low pass filter (a cut-off frequency of 30 [kHz]) into the PWM terminal.

An example of the PWM light control is already described with reference to the above FIGS. 14A to 14C.

Next, the voltage step-up and -down DC/DC controller block of the semiconductor device 20 (the OCP portion 206, comparator 207, control logic portion 208, input buffer 209, oscillator portion 210, slope-voltage generation portion 211, PWM comparator 212, driver control portion 213, driver 214, transistor 215, driver 216, error amplifier 217 and soft start portion 218) is described in detail with reference to the above FIG. 26.

First, detailed description of external connections of the semiconductor device 20, especially circuit elements (N-channel type field effect transistors N1, N2, diodes D2, D3, coil L2, resistors RCS, RLPF, capacitors CBS, CLPF) related to the voltage step-up and -down DC/DC converter is performed.

As shown in FIG. 26, a gate of the transistor N1 is connected with an output terminal of the driver 214 via the OUTH terminal (25th pin). A drain of the transistor N1 is connected with the application terminal of the power-supply voltage VCC via the resistor RCS and also connected with the CS terminal (27th pin) via the resistor RLPF. A source of the transistor N1 is connected with a second power-supply terminal (low-potential terminal) of the driver 214 and a drain of the transistor 215 via the SW terminal (24th pin).

One terminal of the coil L2 is connected with the SW terminal. The other terminal of the coil L2 is connected with an anode of the diode D3. As a lead-out terminal of the output voltage VOUT, a cathode of the diode D3 is connected with the anode of the LED train that is the load.

A gate of the transistor N1 is connected with an output terminal of the driver 216 via the OUTL terminal (22nd pin). A drain of the transistor N2 is connected with a connection node of the other terminal of the coil L2 and the anode of the diode D3. A source of the transistor N3 is connected with the ground terminal.

A cathode of the diode D2 is connected with SW terminal. An anode of the diode D2 is connected with the ground terminal. One terminal of the capacitor CBS for bootstrap is connected with a first power-supply terminal (high-potential terminal) of the driver 214 via the BOOT terminal (9th pin). The other terminal of the capacitor CBS is connected with the SW terminal. One terminal of the capacitor CLPF is connected with the application terminal of the power-supply voltage VCC. The other terminal of the capacitor CLPF is connected with the CS terminal.

Here, in the semiconductor device 20 according to the present embodiment, because the transistors N1, N2 are externally connected, it becomes possible to raise heat radiation.

Next, detailed description of basic operation of the voltage step-up and -down DC/DC controller block is performed.

If the transistors N1, N2 are brought into an on state, a current flows into the coil L2 via a route X and its electric energy is stored. Besides, in a case where electric charges are accumulated in the capacitor CVOUT in an on time of the transistors N1, N2, a current from the capacitor CVOUT flows into the lead-out terminal of the output voltage VOUT. Here, because the other-terminal potential of the coil L2 drops to almost the ground potential via the transistor N2, the diode D3 goes into a backward bias state and a current does not flow from the capacitor CVOUT to the transistor N2.

Next, if the transistors N1, N2 are brought into an off state, the electric energy accumulated there is discharged by a backward voltage generated in the coil L1 via a route Y, flows from the lead-out terminal of the output voltage VOUT into the LED train that is the load, and also flows into the ground terminal via the capacitor CVOUT to charge the capacitor CVOUT.

Accordingly, in the semiconductor device 20 according to the present embodiment, by suitably controlling the duty ratios of the transistors N1, N2 by means of the driver control portion 213, specifically, in a time of voltage step-down operation, the duty ratios of the transistors N1, N2 are decreased to a value smaller than 50%, and to the contrary, in a time of voltage step-up operation, the duty ratios of the transistors N1, N2 are increased to a value larger than 50%, so that it becomes possible to easily and suitably change the voltage step-up and -down operations even with a simple structure.

In other words, in the semiconductor device 20 according to the present embodiment, regardless of whether the power-supply voltage VCC is is higher or lower than the desired output voltage VOUT, it becomes possible to always obtain the desired output voltage VOUT. Accordingly, for example, even in a case where the power-supply voltage VCC changes in a range of 6 to 18 [V] when the desired value of the output voltage is 16 M, it becomes possible to obtain the desired output voltage VOUT. Such structure is suitable for an application, for example, (e.g., a backlight-control LED driver IC for a car navigation monitor) that needs to interact with the power-supply voltage VCC which is directly supplied from a battery.

Note that even in a structure in which the gate of the transistor N2 is connected with the SW terminal, the above voltage step-up and -down operations are possible; however, the semiconductor device 20 according to the present embodiment achieves the breakdown voltage of 36 V, and such a high voltage is likely to be applied to the SW terminal as well. On the other hand, the gate breakdown voltage of the external transistor N2 is not invariably high. Accordingly, in a structure in which the gate of the transistor N2 is connected with the SW terminal, the transistor N2 can be broken.

Because of this, in the semiconductor device 20 according to the present embodiment, as a means to perform the gate control of the transistor N2, the separate driver 216 (which operates on the reference voltage VREG) is prepared, and by using this, the on/off control of the transistor is performed. According to such structure, there is no worry over that the transistor N2 is broken even if the power-supply voltage is a high voltage.

Besides, in the semiconductor device 20 according to the present embodiment, as a ringing protection means in a time of a light load or no load, the N-channel type field effect transistor 215 is integrated.

A drain of the transistor 215 is connected with the SW terminal. A source of the transistor 215 is connected with the ground terminal. A gate of the transistor 215 is connected with a control signal output terminal of the driver control portion 213.

Here, it is desirable that not to cause increase in an unnecessary chip area nor decrease in conversion efficiency, the electric-current capability of the transistor 215 is designed to be the smallest possible capability of removing a small current of ringing noise.

The driver control portion 213 performs the on/off control of the transistors N1, N2, while it performs the on/off control of the transistor 215 in a complementary fashion to this.

According to such structure, even in a case where the output current drops and the coil current is entirely lowered in a light-load or no-load time, and is trapped into a state (so-called discontinuous mode) in which ringing, that is, deformation in a waveform occurs, it is possible to enable the ringing noise to escape to the ground terminal via the transistor 215, so that it becomes possible to raise the stability of the voltage step-up and -down operations.

Here, the language "complementary" used in the above description covers not only a case where the on/off of the transistor N1 (and the transistor N2) and the on/off of the transistor 215 are completely opposite to each other but also a case where from viewpoints of prevention of a through current and the like, a predetermined delay is given to the on/off transition timing of the transistor N1 and the transistor 215.

Next, output feedback control of the voltage step-up DC/DC controller block is described in detail.

The error amplifier 217 amplifies a difference between the smallest value of the LED terminal voltages V1 to V4 applied respectively to the first to fourth inverting input terminals (−) and the predetermined LED control voltage VLED input into the non-inverting input terminal (+), thereby generating an error voltage Verr. In other words, the voltage value of the error voltage Verr goes to a higher level as the output voltage VOUT becomes lower than its target set value.

On the other hand, the PWM comparator 212 compares the error voltage Verr applied to the non-inverting input terminal (+) with a slope voltage Vslp (a sum voltage of the triangular-wave voltage Vosc of the oscillator OSC and the terminal voltage (an electric-current detection signal generated at the resistor RCS) of the CS terminal (27th pin)), thereby generating a comparison signal having a duty ratio depending on the comparison result. In other words, the logic of the comparison signal goes to a high level if the error voltage Verr is higher than the slope voltage Vslp and goes to a low level if the error voltage Verr is lower than the slope voltage Vslp.

Here, the on duty (the ratio of on times of the transistors N1, N2 per unit time) of the comparison signal in a steady operation time changes depending on a relative height difference between the error voltage Verr and the slope voltage Vslp.

During a time the above comparison signal is maintained at the low level, the driver control portion 213 holds the OUTH terminal and the OUTL terminal (i.e., the gate voltages of the transistors N1, N2) at the high level via the driver 214 and the driver 216. Accordingly, the transistors N1, N2 are brought into the on state. On the other hand, during a time the comparison signal is maintained at the low level, the terminal voltages of the OUTH terminal and the OUTL terminal are held at the low level. Accordingly, the transistors N1, N2 are brought into the off state.

As described above, in the voltage step-up and -down DC/DC controller block, the drive control of the transistors N1, N2 is performed based on not only monitoring results of the LED terminal voltages V1 to V4 (and the output voltage VOUT) but also monitoring results of the switch current that flows in the transistor N1. Accordingly, in the semiconductor device 20 according to the present embodiment, even if the error voltage Verr is not able to follow a sharp change in the load, it is possible to directly perform drive control of the transistors N1, N2 based on the monitoring results of the switch current that flows in the transistors N1, N2; accordingly, it becomes possible to effectively curb a change in the output voltage VOUT. In other words, in the semiconductor device according to the present embodiment, because it is not necessary to enlarge the capacity of the output capacitor CVOUT and it is possible to use a low-ESR ceramic capacitor, it becomes possible to avoid an unnecessary cost increase and a size increase in the output capacitor CVOUT.

Next, improved points of the protection circuit in the semiconductor device 20 are described.

First, in the semiconductor device 20 according to the present embodiment, the type of detecting a short in the open/short detection portion 222 is changed to a delay counter type. Specifically, a structure is employed, in which the circuit operation is not immediately made off-latch at a time any of the LED1 terminal to the LED4 terminal reaches 4.5 [V] but made off-latch at a time it is confirmed that any of the LED1 terminal to the LED4 terminal continuously exceeds 4.5 [V] for a predetermined time. By employing such type, it becomes possible to effectively prevent erroneous detection.

Second, in the semiconductor device 20 according to the present embodiment, the protection function portion that detects shorts (chiefly a ground short) in the anode and cathode of the LED and performs suitable protection operation is incorporated. Specifically, the SCP portion 204 has a structure in which when the SCP 204 portion confirms that the terminal voltage VP of the OVP terminal is equal to or lower than a predetermined voltage for a predetermined time, the SCP 204 recognizes that the anode terminal of the TED train ground-shorts (or shorts to a low potential comparable to this), and off-latches the circuit operation. Besides, the open/short detection portion 222 has a structure in which when the open/short detection portion 222 confirms by using an existing open detection function portion that any of the TED terminal voltages V1 to V4 is equal to or lower than a predetermined voltage for a predetermined time, the open/short detection portion 222 recognizes that the cathode terminal of the LED train ground-shorts, and off-latches the circuit operation. By incorporating such protection function portion, it becomes possible to further raise the safety of the semiconductor device 20.

Third, unlike the first embodiment that turns off the load switch Q1 at a stop time of the circuit operation, the semiconductor device 20 according to the present embodiment has a structure in which the OCP signal and the OVP signal are input into the soft start portion 218, and a soft start voltage (a charging voltage for the capacitor CSS) is pulled down at a time of occurrence of trouble. According to such structure, because the soft start is performed again at a time of resumption of the circuit operation, it becomes possible to prevent a rush current at the resumption time.

Finally, an energy-saving function of the semiconductor device 20 is described.

The semiconductor device 20 according to the present embodiment has a structure in which the control logic portion 208 is equipped with a timer latch function; when it is confirmed that the PWM signal is maintained at the low level for a predetermined time, the control logic portion 208 shifts to an energy-saving mode (sleep mode) for lowering the consumed energy of the semiconductor device 20. According to such structure, it becomes possible to achieve the energy saving of the semiconductor device 20. Besides, in the above energy-saving mode, it is desirable not to block the supply route of the power-supply voltage VCC but to turn off operation of a drive current generation portion (not shown) that generates the drive current ICC for each circuit portion.

Here, in the above embodiments, as application targets of the present invention, semiconductor devices that perform the drive control of a backlight of a car navigation monitor, backlights of medium- and small-sized LCD panels are described as the examples; however, the application target of the present invention is not limited to these, and the present invention is widely applicable to other load drive devices.

Besides, it is possible to make various modifications to the structure of the present invention without departing from the spirit of the present invention.

INDUSTRIAL APPLICABILITY

The present invention is a preferred technology for a drive device that performs drive control of a load (a LED backlight of medium- and small-sized LCD panels and the like).

The invention claimed is:
1. A load driver comprising:
a voltage step-up and -down DC/DC converter controller block which controls a voltage step-up and -down DC/DC converter that generates from an input voltage an output voltage and feeds the output voltage to a load; and
a current driver block which generates an output current of the load, wherein
the voltage step-up and -down DC/DC converter comprises:
a first switch of which a first terminal is connected to an application terminal of the input voltage;
a first diode of which a cathode is connected to a second terminal of the first switch and of which an anode is connected to a ground terminal;
an inductor of which a first terminal is connected to the second terminal of the first switch;
a second switch of which a first terminal is connected to a second terminal of the inductor and of which a second terminal is connected to the ground terminal;
a second diode of which an anode is connected to the second terminal of the inductor and of which a cathode is connected to a first terminal of the load; and
a capacitor of which a first terminal is connected to the application terminal of the input voltage and of which a second terminal is connected to the ground terminal.
2. The load driver according to claim 1, wherein the voltage step-up and -down DC/DC converter controller block comprises:
a reference voltage generation portion arranged to generate a reference voltage from the input voltage; and
a driver arranged to turns the second switch on and off, the reference voltage being fed into the driver.
3. The load driver according to claim 1, wherein the current driver block comprises:
a current set portion which generates a reference current; and
a constant-current driver which generates the output current based on the reference current.
4. The load driver according to claim 3, wherein the current set portion outputs a reference voltage based on the reference current to the constant-current driver, and the constant-current driver generates the output current by repeating voltage/current conversion and current/voltage conversion based on the reference voltage.
5. The load driver according to claim 4, wherein the constant-current driver comprises a plurality of trimmable resistors for the voltage/current conversion and current/voltage conversion.
6. The load driver according to claim 5, wherein paired ones of the plurality of resistors are disposed in a staggered layout.
7. The load driver according to claim 3, wherein the current set portion sets the reference current based on a value of whichever is lower of a control voltage fed in externally and a constant voltage previously determined internally.
8. A load driver comprising:
a voltage step-up and -down DC/DC converter controller block which controls a voltage step-up and -down DC/DC converter that generates from an input voltage an output voltage and feeds the output voltage to a load; and
a current driver block which generates an output current of the load, wherein
the voltage step-up and -down DC/DC converter comprises:

a first switch of which a first terminal is connected to an application terminal of the input voltage;

a first diode of which a cathode is connected to a second terminal of the first switch and of which an anode is connected to a ground terminal;

an inductor of which a first terminal is connected to the second terminal of the first switch;

a second switch of which a first terminal is connected to a second terminal of the inductor and of which a second terminal is connected to the ground terminal;

a second diode of which an anode is connected to the second terminal of the inductor and of which a cathode is connected to a first terminal of the load; and a ceramic capacitor of which a first terminal is connected to the cathode of the second diode and of which a second terminal is connected to the ground terminal.

9. The load driver according to claim 8, wherein the voltage step-up and -down DC/DC converter controller block comprises:

a reference voltage generation portion arranged to generate a reference voltage from the input voltage; and a driver arranged to turns the second switch on and off, the reference voltage being fed into the driver.

10. The load driver according to claim 8, wherein the current driver block comprises:

a current set portion which generates a reference current; and a constant-current driver which generates the output current based on the reference current.

11. The load driver according to claim 10, wherein the current set portion outputs a reference voltage based on the reference current to the constant-current driver, and the constant-current driver generates the output current by repeating voltage/current conversion and current/voltage conversion based on the reference voltage.

12. The load driver according to claim 11, wherein the constant-current driver comprises a plurality of trimmable resistors for the voltage/current conversion and current/voltage conversion.

13. The load driver according to claim 12, wherein paired ones of the plurality of resistors are disposed in a staggered layout.

14. The load driver according to claim 10, wherein the current set portion sets the reference current based on a value of whichever is lower of a control voltage fed in externally and a constant voltage previously determined internally.

15. A load driver comprising:

a voltage step-up and -down DC/DC converter controller block which controls a voltage step-up and -down DC/DC converter that generates from an input voltage an output voltage and feeds the output voltage to a load; and a current driver block which generates an output current of the load, wherein the voltage step-up and -down DC/DC converter comprises:

a first switch of which a first terminal is connected to an application terminal of the input voltage, an N-channel type field effect transistor being used as the first switch;

a first diode of which a cathode is connected to a second terminal of the first switch and of which an anode is connected to a ground terminal;

an inductor of which a first terminal is connected to the second terminal of the first switch;

a second switch of which a first terminal is connected to a second terminal of the inductor and of which a second terminal is connected to the ground terminal;

a second diode of which an anode is connected to the second terminal of the inductor and of which a cathode is connected to a first terminal of the load; and a boot strap circuit which is connected to the cathode of the first diode.

16. The load driver according to claim 15, wherein the current driver block comprises:

a current set portion which generates a reference current; and a constant-current driver which generates the output current based on the reference current.

17. The load driver according to claim 16, wherein the current set portion outputs a reference voltage based on the reference current to the constant-current driver, and the constant-current driver generates the output current by repeating voltage/current conversion and current/voltage conversion based on the reference voltage.

18. The load driver according to claim 17, wherein the constant-current driver comprises a plurality of trimmable resistors for the voltage/current conversion and current/voltage conversion.

19. The load driver according to claim 18, wherein paired ones of the plurality of resistors are disposed in a staggered layout.

20. The load driver according to claim 16, wherein the current set portion sets the reference current based on a value of whichever is lower of a control voltage fed in externally and a constant voltage previously determined internally.

* * * * *